(12) United States Patent
Sardanopoli

(10) Patent No.: US 12,217,271 B1
(45) Date of Patent: Feb. 4, 2025

(54) SYSTEMS AND METHODS FOR AI INTEGRATED COMPLIANCE AND DATA MANAGEMENT

(71) Applicant: Regulatory Intelligence Compliance Solutions, Inc., Allendale, NJ (US)

(72) Inventor: Donna Sardanopoli, Allendale, NJ (US)

(73) Assignee: Regulatory Intelligence Compliance Solutions, Inc., Allendale, NJ (US)

( * ) Notice: Subject to any disclaimer, the term of this patent is extended or adjusted under 35 U.S.C. 154(b) by 0 days.

(21) Appl. No.: 18/673,570

(22) Filed: May 24, 2024

Related U.S. Application Data

(60) Provisional application No. 63/593,163, filed on Oct. 25, 2023, provisional application No. 63/589,256, filed on Oct. 10, 2023.

(51) Int. Cl.
  *G06Q 30/018* (2023.01)
(52) U.S. Cl.
  CPC .................................. *G06Q 30/018* (2013.01)
(58) Field of Classification Search
  CPC .................................................... G06Q 30/018
  See application file for complete search history.

(56) References Cited

U.S. PATENT DOCUMENTS

| | | | | |
|---|---|---|---|---|
| 9,824,364 B2 * | 11/2017 | Galligan Davila | .. | G06Q 30/018 |
| 2011/0209197 A1 * | 8/2011 | Sardanopoli | .......... | G06Q 40/04 |
| | | | | 726/1 |
| 2016/0314114 A1 * | 10/2016 | Barbetta | ................. | G06F 40/30 |
| 2018/0053128 A1 * | 2/2018 | Costas | .................... | G06Q 50/18 |
| 2020/0175110 A1 * | 6/2020 | Snyder | ................... | G06N 3/047 |
| 2021/0201412 A1 * | 7/2021 | Goh | ........................ | G06Q 40/02 |
| 2022/0222440 A1 * | 7/2022 | Chowdhury | ........ | G06F 16/3344 |
| 2023/0229812 A1 * | 7/2023 | Adebayo | ................ | G06N 20/00 |
| | | | | 726/26 |

FOREIGN PATENT DOCUMENTS

| | | | | |
|---|---|---|---|---|
| CN | 114819304 A | * | 7/2022 | |
| CN | 116011542 A | * | 4/2023 | |
| CN | 116595474 A | * | 8/2023 | |
| IN | 201741013646 A | * | 10/2018 | |

* cited by examiner

*Primary Examiner* — Florian M Zeender
*Assistant Examiner* — Emily M. Kraisinger
(74) *Attorney, Agent, or Firm* — Wolf, Greenfield & Sacks, P.C.

(57) ABSTRACT

Various embodiments leverage artificial intelligence in identifying and potentially resolving compliance issues (e.g., with regulatory requirements, client-specified requirements, certification conditions, etc.), or preventing violations of law, rules and regulations. The AI can be configured to automatically generate requests for information. For example, a system analysis component can be configured to identify a specific compliance target (e.g., a branch location) and select or automatically generate questions to collect responsive information to ensure compliance, identify potential violations, and define any evidence required to identify or resolve issues (e.g., prove compliance, support potential violations, flagged issues, etc.). According to one example, the system can use trained AI models to analyze a set of rules and/or requirements to efficiently build questionnaires to address or demonstrate compliance.

20 Claims, 23 Drawing Sheets

Regulatory Intelligence
*Compliance Solutions, Inc.*

Welcome, Donna Santaropoli

Dashboard ▾ | Branch Audits ▾ | Schedule Audits | Reports ▾ | Tools ▾ | Help

Search... 🔍

Regulatory Change Management System  Branch Audit Toolkit

My Roles: Audit Manager / Auditor

*Dashboard • Schedule*

Schedule Audits

10 ▾ records

Search: _____

| ID ⇅ | CITY ⇅ | STATE ⇅ | CODE ⇅ | TYPE ⇅ | DUE DATE ⇅ | REGION ⇅ | PHONE ⇅ | PL ⇅ | LAST ⇅ | SCHEDULE ⇅ |
|---|---|---|---|---|---|---|---|---|---|---|
| 441 | Westwood | NJ | 1930 | OSJ | 2023-08-12 | East | 1234567890 | Don Cummings | 08/12/2022 | SCHEDULE |
| 269 | Rockleigh | NJ | 102 | Non-OSJ | 2022-12-31 | East | 1234567890 | Kevin Lopez | | SCHEDULE |
| 264 | Ramsey | NJ | 0802 | OSJ | 2023-08-09 | Midwest | 1234567890 | Samantha Smith | 08/09/2022 | SCHEDULE |
| 242 | Phillipsburg | NJ | 101 | OSJ | 2023-08-10 | South | 1234567891 | Charles Cervantes | 08/10/2022 | SCHEDULE |
| 220 | Oradell | NJ | 1730 | Non-OSJ | 2023-11-01 | West | 1234567891 | Elizabeth Gentry | 11/01/2022 | SCHEDULE |
| 210 | Oakland | NJ | 105 | OSJ | 2022-08-14 | North | 1234567890 | Kellie Wagner | 08/14/2021 | SCHEDULE |
| 154 | Mahwah | NJ | 0561 | Non-OSJ | 2025-10-17 | West | 1234567890 | Patrick Pugh | 10/17/2022 | SCHEDULE |
| 79 | Emerson | NJ | 1630 | Non-OSJ | 2023-09-13 | South | 1234567890 | Bryan Martinez | 09/13/2022 | SCHEDULE |
| 17 | Bloomsbury | NJ | 1046 | OSJ | 2023-08-12 | Midwest | 1234567890 | Anne Vincent | 08/12/2022 | SCHEDULE |

Showing 1 to 9 of 9 items. (filtered from 485 total entries)

Regulatory Intelligence
*Compliance Solutions, Inc.*

Welcome, Donna Sardanopoli

Dashboard ▾ Branch Audits ▾ Schedule Audits Reports ▾ Tools ▾ Help

Search... 🔍

Regulatory Change Management System Branch Audit Toolkit

My Roles: Audit Manager / Auditor

Dashboard • Open Audits • Allendale, NJ • Choose Chapters

Allendale, NJ
Select the applicable chapters to complete the audit

Audit Sections ▾

Chapters:
*Select All / Deselect All*

- ☒ A. BRANCH ADMINISTRATION/REGISTRATION
- ☒ B. REVIEW OF CUSTOMER COMPLAINTS
- ☒ C. REVIEW OF BOOKS AND RECORDS / NEW ACCOUNT DOCUMENTATION
- ☒ D. REVIEW OF CUSTOMER IDENTITY PROGRAM (CIP)
- ☒ E. REVIEW OF CUSTOMER ACCOUNT ACTIVITY
- ☒ F. REVIEW OF SUPERVISION OF SUPERVISORY PERSONNEL
- ☒ G. REVIEW OF RR'S ON HEIGHTENED/SPECIAL SUPERVISION/STATUTORY DISQUALIFIED INDIVIDUALS (SDs)
- ☒ H. REVIEW OF REMOTE/PHYSICAL LOCATIONS/REGULATION SP
- ☒ I. REVIEW OF DISCRETIONARY ACCOUNTS
- ☒ J. REVIEW OF EMPLOYEE/EMPLOYEE RELATED ACCOUNTS
- ☒ K. REVIEW OF EMPLOYEE/EMPLOYEE RELATED OUTSIDE ACCOUNTS
- ☒ L. REVIEW OF OUTSIDE ACTIVITIES / PRIVATE SECURITIES TRANSACTIONS / SHARING IN PROFIT OR LOSSES, BORROWING OR LENDING MONEY AND/OR JOINT ACCOUNTS WITH CUSTOMERS
- ☒ M. REVIEW OF ELECTRONIC AND WRITTEN COMMUNICATIONS, PDAs AND SOCIAL MEDIA/WEB SITES
- ☒ N. REVIEW OF ADVERTISING / MARKETING / SEMINARS / SENIOR INVESTORS / SENIOR DESIGNATIONS
- ☒ O. REVIEW OF ORDER TICKETS AND CONFIRMATIONS
- ☒ P. REVIEW OF ACCOUNT DESIGNATION CHANGES (Cancel/Rebills) and ORDER ERRORS
- ☒ Q. REVIEW OF REGULATION T EXTENSIONS AND RESTRICTED ACCOUNTS
- ☒ R. REVIEW OF BOUNCED CHECKS
- ☒ S. REVIEW OF "P.O. BOX"/"CARE OF"/"HOLD MAIL" ACCOUNTS
- ☒ T. REVIEW OF CUSTOMER CHANGE OF ADDRESS
- ☒ U. REVIEW OF TRANSMITTALS OF FUNDS AND SECURITIES / LETTERS OF AUTHORIZATION
- ☒ V. REVIEW OF SAFEGUARDING CUSTOMER FUNDS AND SECURITIES
- ☒ W. REVIEW OF CURRENCY (BANK SECRECY ACT)
- ☒ X. REVIEW OF TELEMARKETING

Schedule Audits

Dashboard ▾ | Branch Audits ▾ | Schedule Audits | Reports ▾ | Tools ▾ | Help

Regulatory Change Management System — Branch Audit Toolkit

Dashboard • Schedule

Welcome, Donna Sardanopoli

My Roles: Audit Manager / Auditor

10 ▾ records

| ID | CITY | STATE | CODE | TYPE | DUE DATE | REGION | PHONE | FL | LAST | SCHEDULE |
|---|---|---|---|---|---|---|---|---|---|---|
| 219 | Oakland | NJ | 105 | OSJ | 2022-08-14 | North | 1234567890 | Kellie Wagner | 08/14/2021 | SCHEDULE |
| 465 | Zwolle | LA | 7148 | Non-Branch Location | 2022-12-31 | South | 1234567890 | Jordan House | | SCHEDULE |
| 464 | Zanoni | MO | 8576 | OSJ | 2022-12-31 | Midwest | 1234567890 | Brian Bennett | | SCHEDULE |
| 463 | Zahl | ND | 9885 | Non-Branch Location | 2022-12-31 | South | 1234567890 | Craig Wilson | | SCHEDULE |
| 462 | Yucca | AZ | 8643 | Non-Branch Location | 2022-12-31 | West | 1234567890 | William Smith | | SCHEDULE |
| 461 | York | AL | 3692 | Non-OSJ | 2022-12-31 | North | 1234567890 | Mark Yoder | | SCHEDULE |
| 460 | Ygo | GU | 9692 | Non-Branch Location | 2022-12-31 | Midwest | 1234567890 | Dr. Colon | | SCHEDULE |
| 459 | Yeoman | IN | 4799 | OSJ | 2022-12-31 | East | 1234567890 | Robert Wilson | | SCHEDULE |
| 458 | Yap | FM | 8694 | Non-OSJ | 2022-12-31 | West | 1234567890 | Cody Luna | | SCHEDULE |
| 457 | Yalaha | FL | 3479 | OSJ | 2022-12-31 | East | 1234567890 | Victor Austin | | |

Showing 1 to 10 of 465 items.   ‹ 1 2 3 4 5 … 47 ›

©2022 Regulatory Intelligence Compliance Solutions, Inc.    Application by: Regulatory Intelligence Compliance Solutions Inc.

Regulatory Intelligence
Compliance Solutions, Inc.

Welcome, Donna Sardanopoli

| Dashboard ▾ | Branch Audits ▾ | Schedule Audits | Reports ▾ | Tools ▾ | Help |

Search... 🔍

Regulatory Change Management System   Branch Audit Toolkit

My Roles: Audit Manager / Auditor

Dashboard • Reports • RRQ Questionnaire Results - By Person - 2022

RRQ Questionnaire Results - By Person - 2022 Audits
No answers to display

EMAIL : dsardanopoli@optonline.net

Answers Based on "Yes" Responses:

1. Do you have any Customer Complaints that were initiated during the past 2 years?
(If yes, provide customer(s) name, account number(s), and description of the allegations)
Answer: YES - Details : I have 2 Customer Complaints that were initiated during the past 2 years 3. Have you been questioned, by the Compliance Department or Legal Department regarding a complaint, activity in the account, a specific communication (i.e. email, phone, letter, fax) or any other customer/compliance issue within the past 12 months?
(If yes, provide the name and number of each customer account(s) and the reason for the inquiry)
Answer: YES - Details : I have you been questioned, by the Compliance Department regarding a complaint, activity in the account within the past 12 months.

4. Do you communicate with customers or prospective customers via personal E-Mail (i.e. AOL, MSN), utilize instant messaging, text messaging, twitter, facebook, (other social networking sights) while in or out of the office?
(If yes, provide details of the frequency, list of customers contacted and by which means/application)
Answer: YES - Details : I communicate with customers and prospective customers via personal E-mail while in or out of the office 7. Do you communicate or conduct business with the public through a firm issued iPad or similar device?
(If yes, provide details)
Answer: YES - Details : I communicate and conduct business with the public through a firm issued iPad 10. Do you conduct any business (including entering orders on behalf of clients) from any location outside your branch office?
(If yes, provide the location and what type of business is conducted)
Answer: YES - Details : At my home office 15. Do you have any other duties or responsibilities with your firm? i.e. [principal supervisor]
(If yes, Provide title, hours dedicated and description.)
Answer: YES - Details : I am assistant BOM.

16. Have you engaged in any outside business activities (i.e. director, officer, controlling stockholder, partner or sole proprietor of, or an associated person of any other company, entity or charitable organization)?
(Detail the activity, hours per week, if you have been compensated and if you perform the outside activity at the broker dealer's office.)
Answer: YES - Details : I have real estate license and work on weekends 19. Do you have any Employee and Employee Related (members of your household) Accounts at your firm?
(If yes, provide account titles, account numbers and include individual accounts, joint accounts, partnership accounts, custodial accounts, investment club accounts, etc.)
Answer: YES - Details : I have an account with my spouse

FIG. 15

DIRECTIONS:
Choose your options from the filter below to generate a report detailing violations in a given time period for all branches, or those specified by status and state.

| DATE RANGE: | | | SELECT STATES OR NATIONWIDE: | AUDIT STATUS: | APPLY FILTER: |
|---|---|---|---|---|---|
| 01/01/2018 | to | 09/09/2023 | Select | Please Choose ∨ | APPLY FILTER |

| | | |
|---|---|---|
| Chapter A | REVIEW OF BRANCH ADMINISTRATION/REGISTRATION | *14 VIOLATIONS* |
| Chapter B | REVIEW OF CUSTOMER COMPLAINTS | *9 VIOLATIONS* |
| Chapter B | REVIEW OF CUSTOMER COMPLAINTS | *2 VIOLATIONS* |
| Chapter C | REVIEW OF BOOKS AND RECORDS/NEW ACCOUNT DOCUMENTATION | *9 VIOLATIONS* |
| Chapter D | REVIEW OF CUSTOMER IDENTITY PROGRAM (CIP) | *3 VIOLATIONS* |
| Chapter D | REVIEW OF CUSTOMER IDENTITY PROGRAM (CIP) | *2 VIOLATIONS* |
| Chapter E | REVIEW OF CUSTOMER ACCOUNT ACTIVITY | *1 VIOLATION* |
| Chapter F | REVIEW OF SUPERVISION OF SUPERVISORY PERSONNEL | *2 VIOLATIONS* |
| Chapter G | REVIEW OF RR'S ON HEIGHTENED/SPECIAL SUPERVISION/STATUTORY DISQUALIFIED INDIVIDUALS (SD's) | *1 VIOLATION* |
| Chapter H | REVIEW OF REMOTE/PHYSICAL LOCATIONS/REGULATION SP | *3 VIOLATIONS* |
| Chapter I | REVIEW OF DISCRETIONARY ACCOUNTS | *4 VIOLATIONS* | o4.regulatoryintelligence.com/risk_report?year=2023&allYears=T#collapse_10

FIG. 16

DIRECTIONS:
Choose your options from the filter below to generate a report detailing violations in a given time period for all branches, or those specified by status and state.

| DATE RANGE: | | | SELECT STATES OR NATIONWIDE: | AUDIT STATUS: | APPLY FILTER: |
|---|---|---|---|---|---|
| 01/01/2018 | to | 09/09/2023 | Select | Please Choose ▾ | APPLY FILTER |

| Chapter A | BRANCH ADMINISTRATION/REGISTRATION | | 14 VIOLATIONS |
|---|---|---|---|

| QUESTION | QUESTION TEXT | VIOLATIONS |
|---|---|---|
| Question A-1 | Is the "Branch Manager" (BOM) or Supervisory Personnel in charge of the office appropriately qualified and registered as a "Qualified" person? | 5 VIOLATIONS |
| Question A-2 | Are designated supervisory personnel (i.e. Assistant Branch Manager) appropriately qualified and registered as "Qualified" (PERSONS)? | 4 VIOLATIONS |
| Question A-3 | Did the operations manager register as an operations professional and pass the operations professional qualification examination (if applicable) | 1 VIOLATION |
| Question A-4 | Are Registered Representatives ("RRs") appropriately qualified and registered? | 2 VIOLATIONS |
| Question A-7 | Has the branch office had an Internal Audit or Inspection in the appropriate time frame pursuant to FINRA Rule 3110(c)? | 2 VIOLATIONS |

| Chapter B | REVIEW OF CUSTOMER COMPLAINTS | 9 VIOLATIONS |
|---|---|---|
| Chapter B | REVIEW OF CUSTOMER COMPLAINTS | 2 VIOLATIONS |
| Chapter C | REVIEW OF BOOKS AND RECORDS/NEW ACCOUNT DOCUMENTATION | 9 VIOLATIONS |

FIG. 17

| Dashboard ▾ | Branch Audits ▾ | Schedule Audits | Reports ▾ | Tools ▾ | Help |

Welcome, Donna Sardangopoli

Regulatory Change Management System  Branch Audit Toolkit

Search...   My Roles: Audit Manager / Auditor

Dashboard • Reports • RRQ Questionnaire Results - By Person - 2022

RRQ Questionnaire Results - By Person - 2022 Audits
No answers to display

EMAIL: donnasard@optonline.net

Answers Based on "Yes" Responses:

1. Do you have any Customer Complaints that were initiated during the past 2 years?
(If yes, provide customer(s) name, account number(s), and description of the allegations)
Answer: YES - Details: I have 2 Customer Complaints that were initiated during the past 2 years 3. Have you been questioned, by the Compliance Department or Legal Department regarding a complaint, activity in the account, a specific communication (i.e. email, phone, letter, fax) or any other customer/compliance issue within the past 12 months?
(If yes, provide the name and number of each customer account(s) and the reason for the inquiry)
Answer: YES - Details: I have you been questioned, by the Compliance Department regarding a complaint, activity in the account within the past 12 months.

4. Do you communicate with customers or prospective customers via personal E-Mail (i.e. AOL, MSN), utilize instant messaging, twitter, facebook, (other social networking sights) while in or out of the office?
(If yes, provide details of the frequency, list of customers contacted and by which means/application)
Answer: YES - Details: I communicate with customers and prospective customers via personal E-mail while in or out of the office 7. Do you communicate or conduct business with the public through a firm issued iPad or similar device?
(If yes, provide details)
Answer: YES - Details: I communicate and conduct business with the public through a firm issued iPad 10. Do you conduct any business (including entering orders on behalf of clients) from any location outside your branch office?
(If yes, provide the location and what type of business is conducted)
Answer: YES - Details: At my home office 15. Do you have any other duties or responsibilities with your firm? i.e. [principal supervisor]
(If yes, Provide title, hours dedicated and description.)
Answer: YES - Details: I am assistant BOM.

16. Have you engaged in any outside business activities (i.e. director, officer, controlling stockholder, partner or sole proprietor of, or an associated person of any other company, entity or charitable organization)?
(Detail the activity, hours per week. If you have been compensated and if you perform the outside activity at the broker dealer's office.)
Answer: YES - Details: I have real estate license and work on weekends 19. Do you have any Employee and Employee Related (members of your household) Accounts at your firm?
(If yes, provide account titles, account numbers and include individual accounts, joint accounts, partnership accounts, custodial accounts, investment club accounts, etc.)
Answer: YES - Details: I have an account with my spouse

FIG. 18

Regulatory Intelligence
*Compliance Solutions, Inc.*

Exhibit 1

Dashboard | Branch Audits | Schedule Audits | Reports | Tools | Help

Regulatory Change Management System Branch Audit Toolkit

*Dashboard » AI Manager*

AI Manager

| Enable | Feature | Description |
|---|---|---|
| | Auto Scheduler | Schedules Adults |
| | Branch Office Manager Interview | AI will review BOM responses and assess for completeness/accuracy. AI will draft follow-up questions, where required, and assess for completeness/accuracy. |
| | Chapter Selection | AI will select type of branch, (e.g., OSJ, NON-OSJ, NBL, Residence) and type of audit (Announced vs. Unannounced) |
| | Document Request List | Pre-determine the audit period for each responsive item |
| | Identify patterns | Identify systemic issues based on branch, branch personnel and/or prior Auditor's and Audit Manager(s). |
| | Main Audit - Modules/Chapters | AI will replace the Auditor here and perform the actual audit. |
| | Main Audit - Attestation | AI (as the Auditor) will attest via check box that all applicable chapters to the Branch Audit have been completed, that audit procedures were followed, and that appropriate documentation has been reviewed. |
| | Main Audit - Move to Closed | AI (as the Auditor) will then click the "I Accept" button, whereby the audit gets closed. |
| | Periodic emails | Monthly emails to the Audit Manager. |
| | Registered Representative Questionnaire | RRQ |
| | Violation Report | AI will send an email to the BOM that contains a link and access code to the digital Violation Report. |

FIG. 20

SYSTEMS AND METHODS FOR AI INTEGRATED COMPLIANCE AND DATA MANAGEMENT

RELATED APPLICATIONS

This application claims the benefit under 35 U.S.C. § 119 (e) of U.S. Provisional Application Ser. No. 63/589,256, filed Oct. 10, 2023, and entitled "SYSTEMS AND METHODS FOR AI INTEGRATED COMPLIANCE AND DATA MANAGEMENT," which is hereby incorporated herein by reference in its entirety. This application claims the benefit under 35 U.S.C. § 119 (e) of U.S. Provisional Application Ser. No. 63/593,163, filed Oct. 25, 2023 and entitled "SYSTEMS AND METHODS FOR AI INTEGRATED COMPLIANCE AND DATA MANAGEMENT," which is hereby incorporated herein by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

In the financial services industry, a variety of regulatory, audit and certification requirements apply to prevent violation of securities laws, rules and regulations by covered entities and their employees, and to promote compliance with firm's written policies and procedures. The regulations include federal, state, and local laws, implements of rules and regulations promulgated by federal and state industry regulators, as well as Self Regulatory Organizations ("SROs"). For example, the U.S Securities and Exchange Commission ("SEC") oversees promulgated rules for self-governance of security exchanges known as "FINRA." Conventionally, compliance with such regulations and certifications are performed manually and have been known to be fraught with error, and even neglected entirely, subjecting various companies to liability, violation remediation, among a host of other issues.

SUMMARY

The inventors have realized that there is a significant need for a technical solution to compliance and data management that can also be configured to integrate artificial intelligence ("AI"), for example, into guided solutions. Various embodiments leverage artificial intelligence in identifying and potentially resolving compliance issues (e.g., with regulatory requirements, client-specified requirements, certification conditions, etc.), or preventing violations of law, rules and regulations. The AI can be configured to automatically generate requests for information. For example, a system analysis component can be configured to identify a specific compliance target (e.g., a branch location) and select or automatically generate questions to collect responsive information to ensure compliance, identify potential violations, and define any evidence required to identify or resolve issues (e.g., prove compliance, support potential violations, flagged issues, etc.). According to one example, the system can use trained AI models to analyze a set of rules and/or requirements to efficiently build questionnaires to address or demonstrate compliance.

In further embodiments, the analysis component can be implemented as an AI model trained on historic information and information collection examples. The training data set can include potential issues, required information for resolution, among other options. The AI model can link a specific compliance target (e.g., branch location) to information requests tailored to the compliance target, tailored to a respondent interacting with the system, tailored to risk assessments, and/or tailored to client supplied requirements, among other options.

In some embodiments, the system can guide users (e.g., respondents, auditors, etc.) through information collection via guided user interfaces that are automatically generated. The user interface (UI) can be responsive to and evaluate inputs for compliance, completeness, etc. Each response can be evaluated by an AI model, immediately identifying issues (e.g., non-compliance, incomplete response, ambiguous response, etc.). Various AI models can be linked to the UI to provide feedback on user input, suggest options for responses, and/or to guide user interaction with the system. In some examples, the system can automatically generate or guide interviews with respondents that can take place visually, via voice, and/or via questionnaires displayed in the UI. The guided functions can be generated for any type of user, including respondents and auditors. Various dashboards can be generated and displayed to provide information on the data collection phases, evaluation of responses and/or evidence input into the system, risk assessments, violation determinations, potential resolutions, and in further example, can manage the scheduling and execution of the various phases to ensure compliance with regulatory or client specified time constraints.

According to some embodiments, the system can include scheduler intelligence (e.g., AI) that ensures compliance in any compliance evaluation and execution (e.g., with respect to an audit and timing). The UI and scheduler can interact to highlight information or to highlight evaluation steps that need to be completed, are approaching time constraints, among other options. In some examples, the scheduler AI is trained on time frames required to complete compliance steps, and automatically generates schedules to ensure compliance, and update, dynamically, UI elements as timelines may be exceeded.

Various embodiments of a compliance system are configured to manage a variety of regulated businesses. According to one embodiment, the system is configured to manage any regulated business that uses reviews of, or otherwise audits, its business activities to assess compliance with any applicable federal, state or local laws, regulations or rules, including that which may be promulgated by any applicable self-regulatory organization ("SRO"), standards, organization, certificate authority, or other governing body, as well as internationally defined standards.

Each and any requirement specified by any rules or regulation can be provided to the system and used by AI models to provide compliance operations. For example, in the audit context, many regulations/rules apply, and each such regulation can be managed by the system.

According to one aspect, an artificial intelligence system is provided. The system comprises: at least one processor, a memory operatively coupled to the at least one processor; the at least one processor when executing configured to evaluate, using a first AI model, a plurality of constraints (e.g., FINRA rules, custom rules, etc.) to automatically identify a set of execution requirements (e.g., evaluation criteria) automatically generate, using a second AI model, visual interface objects (e.g., display screens/interfaces) for display in a user interface to capture results (e.g., user responses) on which to evaluate execution status for the set of execution requirements on a plurality of execution targets, (e.g., branch location, non-branch, etc.); analyze retrieved results to the displayed visual interface objects from an interactive session display, the results associated with respective execution targets (e.g., branch location, non-branch, etc.); automatically evaluate, using a third AI model, the retrieved results and automatically generate and display supplemental visual interface objects in response to determining additional data is required, and generate, using a fourth AI model, an assessment responsive to completion of analysis of the results for each of the execution targets (e.g., risk assessment for audit completion) and update a status associated with an execution evaluation (e.g., open, closed, archived, etc.), wherein the assessment includes analysis of the retrieved results generated from the displayed visual interface objects, supplemental visual interface objects, and any additional data source.

According to one embodiment, the at least one processor is configured to select and execute a respective instance of the first artificial intelligent ("AI") model trained on a plurality of constraints and linked information requirements responsive to definition of the set of execution requirements. According to one embodiment, the first AI model accepts the set of execution requirements (e.g., plurality of rules) as input during training and generates natural language processing ("NLP") text outputs during prediction, the NLP outputs configured to solicit information to verify execution requirements and any of the plurality constraints and linked information requirements. According to one embodiment, the at least one processor or first AI model is further configured to tailor the NLP text outputs (e.g., questions, request for documents, etc.) to a plurality of execution targets (e.g., branch (e.g., OSJ, non-OSJ, NBL, etc.)) and present the NLP text outputs as at least part of the visual interface object.

According to one embodiment, the first AI model is configured to accept specification of an execution target and generate the NLP text outputs tailored to the execution target. According to one embodiment, the at least one processor is configured to execute a second AI model trained on answers to information requests and labeled responses. According to one embodiment, the labeled responses included complete responses and incomplete responses. According to one embodiment, the second AI model is configured to accept respondent answers to information requests and predict an output evaluation of complete or incomplete. According to one embodiment, the second AI model is also trained on supplemental responsive information and responses evaluated as incomplete. According to one embodiment, the at least one processor or the second AI model is configured to generate supplemental information requests associated with responses classified as incomplete.

According to one embodiment, the at least one processor is configured to execute a guided interview session with a respondent based on the NLP text outputs. According to one embodiment, the at least one processor is configured to generate text to speech audio and present the NLP text outputs as voice prompts to the respondent. According to one embodiment, the at least one processor is configured to execute a third AI model trained on responses and labeled risk categories or violations and labeled risk categories. According to one embodiment, the at least one processor is configured to execute a fourth AI model (e.g., scheduler AI) trained on execution task and completion time.

According to one aspect, a computer implementation method for managing an artificial intelligence system is provided. The method comprises evaluating, using a first AI model executed by at least one processor, a plurality of constraints (e.g., FINRA rules, custom rules, etc.) to automatically identify a set of execution requirements, (e.g., evaluation criteria); generating, automatically with a second AI model executed by the at least one processor, visual interface objects (e.g., display screens/interfaces) for display in a user interface to capture results (e.g., user responses) on which to evaluate execution status for the set of execution requirements on a plurality of execution targets, (e.g., branch location, non-branch, etc.); analyzing, by the at least one processor, retrieved results to the displayed visual interface objects from an interactive session display, the results associated with respective execution targets (e.g., branch location, non-branch, etc.), including automatically evaluating, using a third AI model executed by the at least one processor, the retrieved results and automatically generate and display supplemental visual interface objects in response to determining additional data is required, and generating, using a fourth AI model executed by the at least one processor, an assessment responsive to completion of analysis of the results for each of the execution targets (e.g., risk assessment for audit completion) and update a status associated with an execution evaluation (e.g., open, closed, archived, etc.), wherein the assessment includes analysis of the retrieved results generated from the displayed visual interface objects, supplemental visual interface objects, and any additional data source.

According to one embodiment, the method comprises selecting and executing, by the at least one processor, a respective instance of the first artificial intelligent ("AI") model trained on a plurality of constraints and linked information requirements responsive to definition of the set of execution requirements. According to one embodiment, the method comprises accepting the set of execution requirements (e.g., plurality of rules) as input during training of first AI model and generating natural language processing ("NLP") text outputs during prediction, the NLP outputs configured to solicit information to verify execution requirements and any of the plurality constraints and linked information requirements. According to one embodiment, the method comprising tailoring the NLP text outputs (e.g., questions, request for documents, etc.) to a plurality of execution targets (e.g., branch (e.g., OSJ, non-OSJ, NBL, etc.)) and presenting the NLP text outputs as at least part of the visual interface object by the at least one processor or the first AI model. According to one embodiment, the first AI model is configured to accept specification of an execution target and generate the NLP text outputs tailored to the execution target. According to one embodiment, the method further comprises executing, by the at least one processor, the second AI model trained on answers to information requests and labeled responses.

According to one aspect a compliance system is provided. The system comprises at least one processor; a memory operatively coupled to the at least one processor; the at least one processor when executing configured to: evaluate a plurality of rules (e.g., regulations and/or client supplied requirements) to identify a set of compliance requirements; generate information requests to establish compliance status based on the set of compliance requirements for a plurality of compliance targets; analyze respondent answers to the information requests associated with each of the compliance targets (e.g., branch locations); automatically validate complete answers or automatically request supplemental information in response to incomplete answers; and generate a risk assessment responsive to completion of analysis of the respondent answers for each of the compliance targets and update a status associated with a compliance evaluation (e.g., closed and archive).

According to one embodiment, the at least one processor is configured to execute a first artificial intelligent ("AI") model trained on a plurality of rules and linked information requirements responsive to the plurality of rules. According to one embodiment, the first AI model accepts the plurality of rules as input and generates natural language text outputs, the NLP outputs tailored to solicit information to verify compliance with the plurality of rules. According to one embodiment, the at least one processor or first AI model is further configured to tailor the natural language text outputs (e.g., questions, request for documents, etc.) to a plurality of compliance targets (e.g., brank (e.g., OSJ, non-OSJ, NBL, etc.)). According to one embodiment, the first AI model is configured to accept specification of a compliance target and generate the natural language text outputs tailored to the compliance target.

According to one embodiment, the at least one processor is configured to execute a second AI model on answers to information requests and labeled responses. According to one embodiment, the labeled responses identify complete responses and incomplete responses. According to one embodiment, the second AI model is configured to accept respondent answers to information requests and output an evaluation of complete or incomplete. According to one embodiment, the second AI model is trained on supplemental responsive information for responses evaluated as incomplete. According to one embodiment, the at least one processor or the second AI model is configured to generate supplemental information requests associated with responses classified as incomplete.

According to one embodiment, the at least one processor is configured to execute a guided interview session with the respondent based on the natural language text outputs. According to one embodiment, the at least one processor is configured to generate text to speech audio and present the natural language text outputs as voice prompts to the respondent. According to one embodiment, the at least one processor is configured to execute a third AI model trained on responses and labeled risk categories and violations and labeled risk categories. According to one embodiment, the at least one processor is configured to execute a fourth AI model (e.g., scheduler AI) trained on compliance task and completion time.

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed herein with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by reference signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. In the figures:

FIGS. 4-18 illustrate example screen captures and/or features of various embodiments of user interfaces;

FIG. 20 illustrates an example screen capture according to one embodiment;

DETAILED DESCRIPTION

According to various embodiments, a compliance system is configured to execute a plurality of AI models to manage phases of compliance execution. According to one embodiment, the AI models can be trained and tailored to specific tasks and phases: information collection and automatic generation of requests for information (e.g., automatic generation of questionnaires); assessment of information collection; automatic generation of requests to resolve any assessed issues; which can include AI guided collection, AI assessment, and/or AI managed follow up, among other options. The phases and tasks can be managed by respective AI models and tailored to a variety of compliance targets (e.g., OSJ branch, non-OSJ branch, non-branch location, etc.), and can also be tailored to specific users (e.g., respondent, branch office manager, auditor, etc.).

Examples of the methods, devices, and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements, and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element, or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
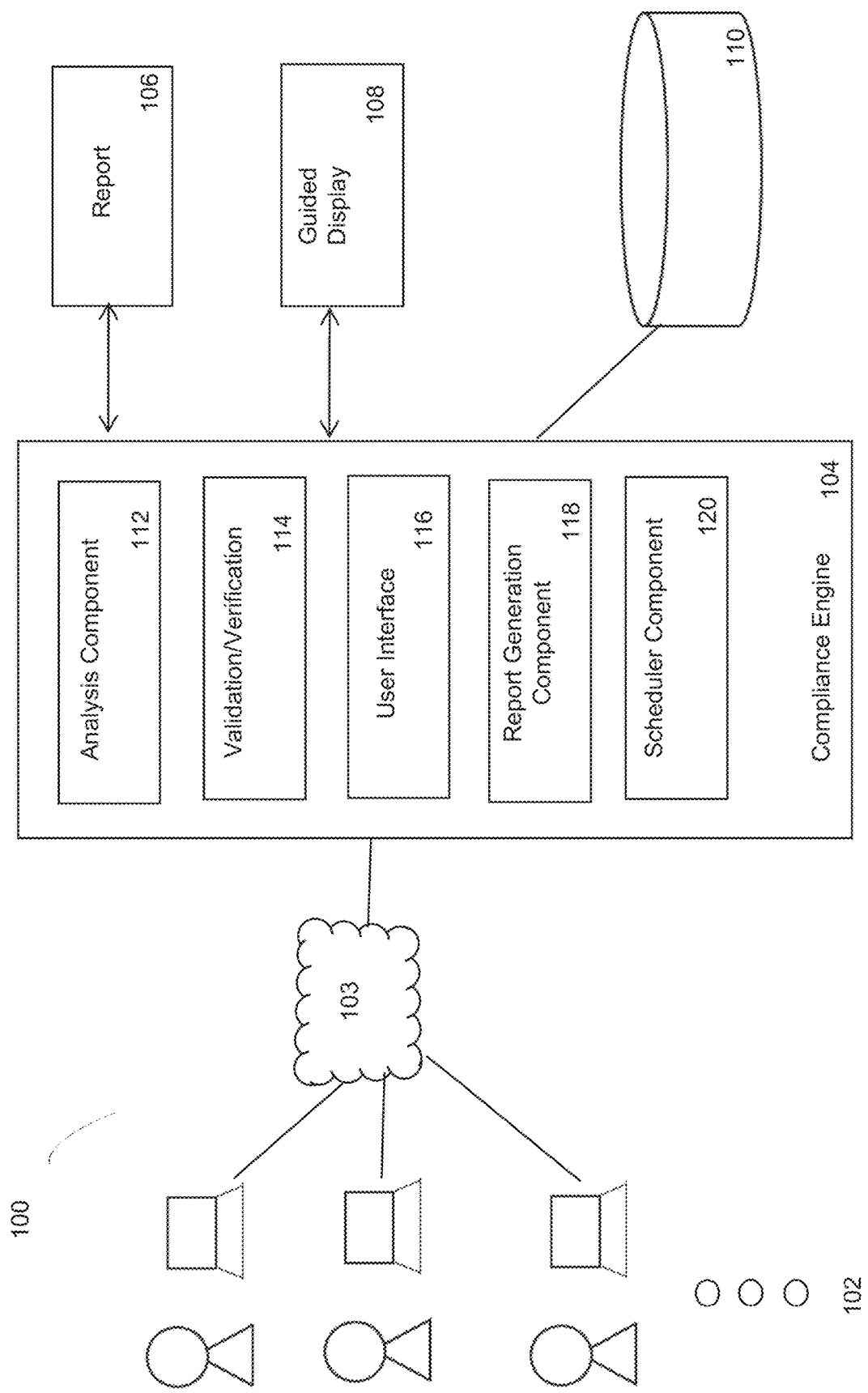
FIG. 1 is a block diagram of an example system, according to one embodiment.

FIG. 1 is an example block diagram of a compliance system 100. As shown a plurality of users (e.g., 102) can access the compliance system, for example, through the Internet (e.g., 103) or another network. The compliance system 100 can include a compliance engine 104 and the system or engine can be configured to instantiate a plurality of components to provide functionality, analysis, interfaces to end users (e.g., 102). In some embodiments, the compliance engine 104 is optional and the system can generically provide any of the respective functions discussed with respect to various components and/or interfaces.

According to one embodiment, the system 100 or engine 104 can instantiate an analysis component 112. The analysis component can be configured to access a set of rules or requirements used in a respective compliance execution. The set of rules and/or requirements can be stored in a database connected to the system (e.g., 110). In other examples, the system can connect to a cloud-based resource to access associated rules, requirements, and/or any restrictions that apply to a given compliance review.

According to some embodiments, the analysis component 112 is configured to analyze a set of rules or requirements to automatically generate questions that will be presented in a user interface to a respondent. Respondents may come in many forms and may include a branch manager ("BOM"), or other respondent (e.g., associated with a branch). In a conventional setting, an auditor would review rules that may apply or review client requirements and generate questions and attempt to answer and ensure compliance with a set of associated rules and/or requirements. With embodiments of the present system, the analysis component is configured to access a first AI model that is trained to build questions on rules and requirements associated with a compliance evaluation. For example, the first AI model can access information on a compliance target via a stored profile and automatically generate respondent links for one or more respondents who will supply information to the system.

In some embodiments, the system is configured to provide a first set of questions to a user (e.g., auditor), to identify a context for further questions. In one example, the system can provide a first set of questions to identify a location type (e.g., OSJ) and from the location select further questions to present.

According to some embodiments, a compliance evaluation can span multiple offices, multiple respondents, and require management and tailored functions for each. A compliance target profile can be stored in the database (e.g., 110) and can be accessed or associated with a specific evaluation. Once a profile is associated with an evaluation the system can automatically generate links for respective respondents, and the links can provide tailored access (e.g., targeted functionality) for such users. According to some embodiments, respective links can be configured to present tailored user interfaces, for example in a guided display (e.g., 108). Example AI models that can be invoked by the analysis component 112 are discussed with greater detail below. Example question answers presented are also provided in greater detail below.

According to one embodiment, the analysis component 112 can be configured to review a set of rules associated with FINRA, and automatically build questions to capture information to establish compliance or to identify issues. The questions can be presented in the user interface and displayed to end users (e.g., 102). The user's responses can be evaluated dynamically. According to one embodiment the system and/or engine can instantiate a validation or verification component 114. The validation component 114 can be configured to evaluate user responses to respective questions and identify potential issues, ambiguity, and/or validate a response to a given question. According to one embodiment, the validation component can include artificial intelligent models that are trained on prior question and labelled response data. In some examples, labeled data can be generated on all questions in an audit that was completed successfully (e.g., complete response label assigned where no follow up required, incomplete where subsequent questions or follow up used (e.g., including requests for documentation, additional information, etc.), documentation required, etc.).

In response to a given input, the AI model can be configured to identify potential issues, and request specific information to address any potential issue. In other examples, natural language predictions from LLMs can be used to predict if a given response is complete, if follow up is require, if documentation is required, etc. In some settings, the AI model can identify an ambiguous response and automatically generate a follow-up question to resolve any ambiguity. In another example, the AI model can identify potential issues in a response and steps that need to be taken to remediate the potential issue. In one example, a question-and-answer session can identify that a respondent works outside of the company's time, which may represent a violation of accessed rules. The AI model can be configured to identify the potential issue and request additional information about the outside work to ensure compliance, or to identify a potential issue, or identify a permitted circumstance (e.g., company permitted outside work).

According to some embodiments, the AI models are configured to evaluate a set of rules and any requirements to determine a set of questions that address any information required, which may also include requests for specific documents/documentation. In some examples, the AI models are trained to evaluate rules and requirements to derive a set of common questions to answer or validate compliance with the body of rules/requirements. In one example, questions directed to FINRA requirements can be refined or overridden by more restrictive client supplied requirements, and vice versa. In some embodiments, the AI models are trained to eliminate redundancies in rule sets, as well as identify when responses to overlapping requests are still required.

In further embodiments, the AI model can be configured to identify complete responses and, for example, update a question status accordingly. The system can also be configured to flag or associate an incomplete status with questions that need follow-up or additional information.

According to some embodiments the system and/or engine can instantiate a user interface component 116. The user interface component 116 can be configured to display or interact with questions generated by any AI model and/or any component. For example, the questions generated by the analysis component 112 can be displayed via the user interface to end users. The respective responses received from the end users can be evaluated by validation component 114, and follow-up requests for information presented via the UI component 116.

According to some embodiments, the user interface 116 is configured to highlight compliance execution tasks and associate task execution schedules to manage completion of a compliance review. In some embodiments, the system and/or engine can be configured to instantiate a schedule or component 120. The scheduler component can be configured to access AI models that are configured to derive schedules for tasks that need to be completed to perform an evaluation. In further examples, the scheduler component and/or AI models can be configured to automatically schedule tasks in a compliance review. Additionally, the scheduler component and/or AI models can be configured to manage timelines associated with respective tasks. In some examples, displays associated with specific tasks can be emphasized based on a time frame for completion e.g., generated by the schedule component). According to some embodiments, the scheduler component can include AI models that are configured to analyze specific tasks and determine a time frame associated for completing the specific task. The scheduler component can be configured to allocate a schedule that takes each step and respective time periods into account to ensure a target completion date is maintained. On completion of the various tasks a compliance report can be generated (e.g., 106), and displayed via the UI to respective users.

According to one embodiment, the system and/or engine can instantiate a report generation component 118. The report generation component can be configured to manage construction of a compliance report that details information on the various steps and/or phases of a compliance evaluation. The report generation component 118 can be configured to update a report and/or display as steps of an evaluation are completed, information is collected, issues identified, among other options. In further embodiments, the scheduler component 120 can be configured to update displays in generated reports based on timetables and timeframe thresholds, among other options.

As discussed above, the system 100 and/or engine 104 can instantiate various components to perform compliance functions, however, the system itself can perform any of the described functions without instantiation of the engine or the respective components.

Figure 2:
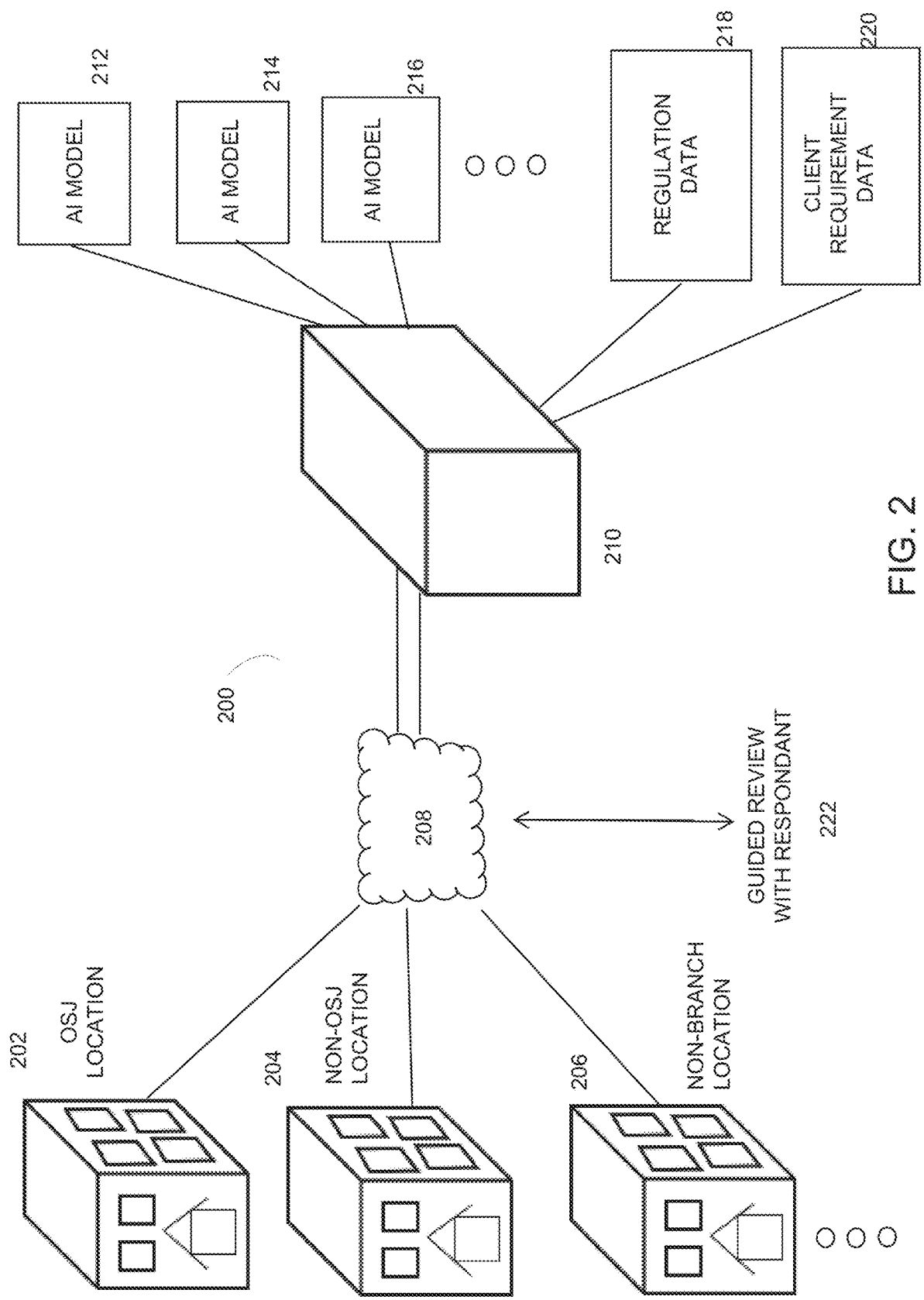
FIG. 2 is a block diagram of an execution environment, according to one embodiment.

FIG. 2 is a block diagram of an example execution environment for a compliance system (e.g., 100). In the example environment 200, the compliance system 210 can be used to conduct an audit of a company governed by FINRA rules (e.g., 218—which can include "legal" data (i.e. any requirement dictated by law)). The example is provided to highlight functionality and explain features of the compliance system, however various embodiments can be extended beyond FINRA settings, and the respective models used to evaluate rules and requirements can be applied to different settings and different compliance tasks, as well as manage follow-up, requests for additional information, among other options.

According to one embodiment, a compliance evaluation is being performed against a company having a plurality of locations. Example locations are shown at 202 (e.g., OSJ location), 204 NON-OSJ location, and 206 non-branch location "NBL." Various location types and associated audit requirements are described in greater detail below and can be included with respect to the three dots shown as to the location/audit types that apply. In some examples, each location may access the Internet (e.g., 208) or other network to communicate with a compliance system 210. According to some examples, computer systems at the respective locations may access the Internet and authenticate with the compliance system 210. In other examples, local programs can interface directly with a compliance system 210. The local programs can include monitor processes configured to track audit execution, respective steps, scheduled tasks, among other options. The local programs can be configured to trigger communications and/or requests for updates to facilitate management of an audit. In still other embodiments, application programming interfaces may be executed at respective locations (e.g., 202-206) that can be configured to interface with the compliance system 210. As shown, the compliance system 210 can include a plurality of AI models (e.g., 210-216) and store regulation data (e.g., 218) and/or client requirement data (e.g., 220) and/or other audit requirements or data (e.g., 220). When conducting an audit, a system user can access the compliance system 210 to begin creation of an audit. For example, an audit manager can access the system to define regulations and client requirements which are interpreted according to an AI model into tasks and deadlines for completing a respective audit. Once an audit is defined on the system, the system can automatically generate respondent links which can be sent to the respective locations (e.g., 202-206) and/or registered respondents (e.g., BOM, etc.).

Figure 21:
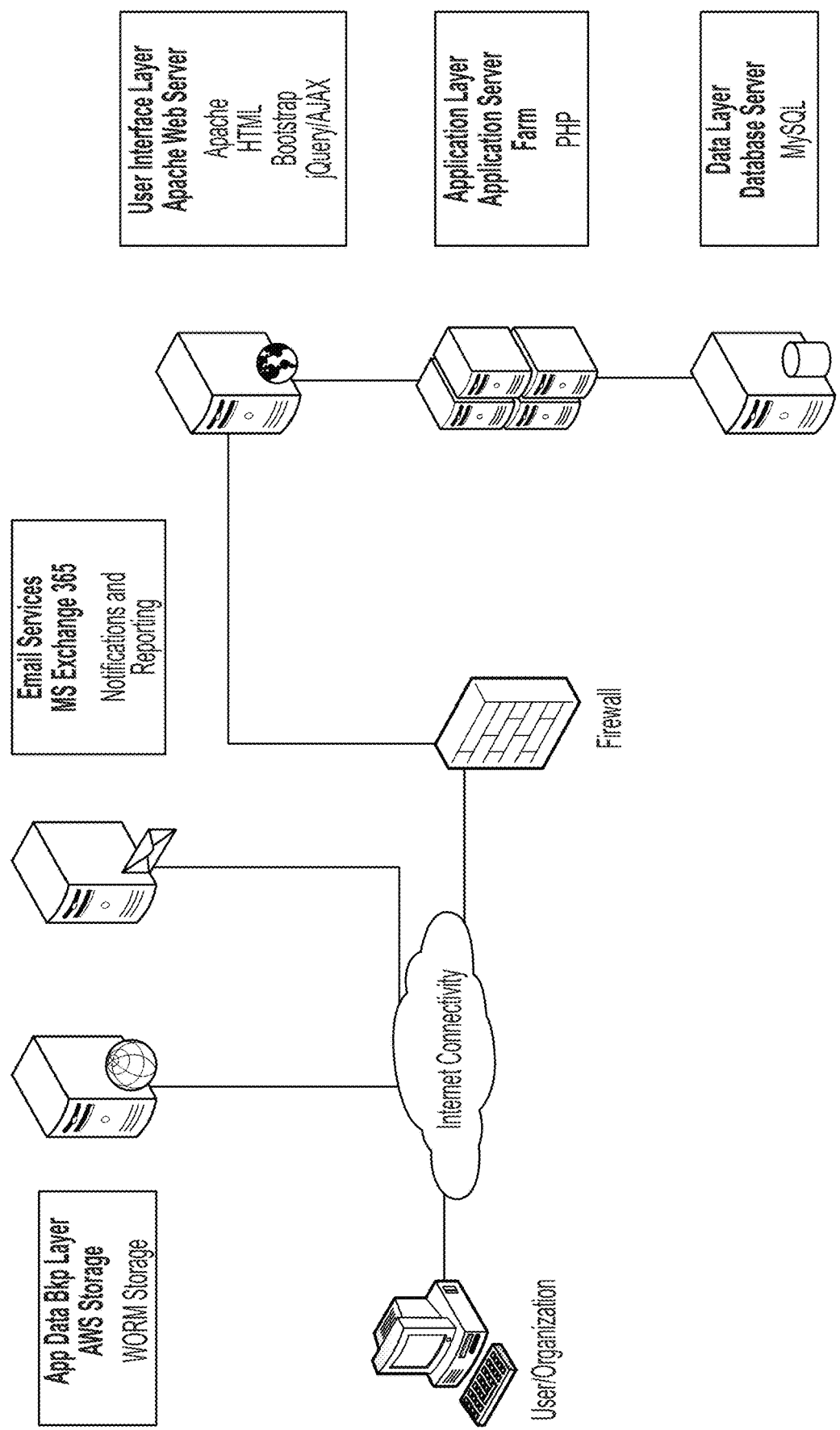
FIG. 21 is a block diagram of an example embodiment.

In still other embodiments, the compliance system 210 can be configured to manage a guided review with a respondent at 222. For example, an AI model can generate automatically questions for a given audit. The system 210 can be configured to display those questions to a respective respondent along with immediate evaluation of a respondent's input. In some examples, the guided review with the respondent can include suggestions or recommendations for providing evidence or resolving issues, and may also include explanations on information required, associated rules which can be cited or explained during a guided review. FIG. 21 illustrates an example architecture for embodiments of the compliance system.

According to one embodiment, the execution of an audit by the system is designed to ensure complete information capture, identification of associated issues, evaluate risk associated with responses currently received and/or historical responses in prior audits, ultimately to produce an audit report according to any scheduling deadline.

Implementation Examples

Various examples are described with respect to the compliance system to illustrate functions and/or specific operations that improve compliance execution over known approaches. The various examples are provided for illustration purposes. The example can be described with respect to audit functionality that can also be applied in other embodiments to compliance management and functionality within the regulated financial services context, and across other regulated industries and sectors.

For example, a variety of AI models are used to support functionality implemented on the compliance system (e.g., 100, 210, etc.). These AI models can be trained on rules, regulations, prior disciplinary actions, regulatory releases, audit procedures, etc. In further examples, one or more AI models can be trained on prior responses to compliance questionnaires and/or prior responses to respondent interviews. In still other examples, training can be based on evaluated responses that are labeled as complete, and evaluated responses that are labeled as incomplete. Similarity to complete/incomplete responses can be used to evaluate responsive inputs. Incomplete responses can be used as training data in conjunction with resolution or follow up information that completed incomplete responses. A trained model can then output associated completion options in response to identification of incomplete responses.

In various embodiments, an attestation on an audit is used by the system to make sure all the questions are answered, and the audit is complete in order to move to a closed audit file. In still other embodiments, the system is configured to verify that an audit is completed, which can trigger processes to communicate the completed audit to a supervisor such as the Audit Manager or branch office manager ("BOM"). In some examples, the AI models are implemented as ANNs (Artificial Neural Networks) which are tailored to solving complex problems. In other examples, CNNs (Convolution Neural Networks) are implemented to evaluate computer vision-related problems associated with an audit (e.g., verify documents submitted include requested information, among other options). RNNs (Recurrent Neural Networks) are implemented by the system to facilitate Natural Language Processing ("NLP"), and can be used in the context of understanding respondent answers to audit questions, among other options. Other machine learning models can be used and/or trained, and include generative AI models ("GAI"), as well as large language models ("LLMs"), among other options, including, for example, small language models ("SLMs").

According to some embodiments, once trained, the various models used by the system are configured to output probabilities, some may classify data and output a risk analysis (high, medium, low risk, etc.), some models may identify patterns (e.g., audit red-flag) and others may provide potential solutions or requirements to resolve issue. As discussed, the data to input into models includes the information received by the branch in response to the document request list. Having AI review this information provided by the branch whether it be documents, answers to questionnaires, answers to interviews and follow up requests for documents that need to be reviewed. In some examples, the AI model outputs are the result of each review performed; and assigned conclusions (e.g., whether there is a regulatory violation, firm procedure violation and/or concern, among other options). In further example, the analyses of the questions answered in respective questionnaires and/or interview(s) drive the system to determine that follow up questions to the answers provided are required before a result is obtained for an audit and/or its status changed closed.

In some examples, the AI model produces an output that needs to be processed, including for example, linking action to respective model outputs. One example includes pattern matching to a rule violation and linking the match to prior data capture to identify compliance/non-compliance and potential resolution. In other examples, specific criteria is managed by an AI model to identify times when no pattern match occurs, but a violation is present. A violation may be unique and only present in a specific context/area, which is why various embodiments include multiple AI models configured to identify violations trained to the details of the rules and audit procedures.

Example Audit Execution Considerations

Various embodiments of the compliance system are specifically tailored to execute audits in the context of FINRA rules and requirements. Example participants, locations and requirements are discussed with respect to executing an audit in this context. According to various embodiments, the functionality, operations, and processes executed during the FINRA governed audit are applicable to the broader compliance and data management context, and can be used in conjunction with different rules, regulations, and parties (e.g., respondents, auditors, audit managers, compliance officers, compliance managers, etc.). According to one embodiment, the system is configured to generate a Registered Representative Questionnaire ("RRQ") automatically as part of an audit execution. For example, the system is configured to generate the content for the RRQ based on system-based content or client's content. The system-based content can be defined in association with regulatory rules, governing regulations, certification authorities, etc. In one embodiment, relevant regulation can be linked to specific audit targets (e.g., OSJ location, Non-OSJ, NBL, etc. (as described in greater detail below)).

According to one example, the system is configured with monitoring processes to identify and update system-based content in response to rule changes, published violation information, rulings on regulations or rules that impact interpretation or required information, among other options. In some examples, the system invokes AI models configured to automatically generate an email/communication that includes a URL and initial registered representative ("RR") code that each RR will use to access and complete the RRQ. In some embodiments, the system and/or AI is configured to automatically send the email to the BOM.

In further embodiments, as each RR logs into the system and inputs responses to the RRQ, each answer is automatically evaluated. For example, the system is configured to determine if the input responses provide complete answers or require follow-up questions (e.g., FIGS. 15 and 18). For any responses requiring follow up, the system can immediately and dynamically request additional information. In some examples, the system implements a large language model to evaluate RR answers to questions in the RRQ. In one example, the system provides a Chatbot configured to evaluate responses for completeness. In another example, the system cross-references RR answers against known data to identify potential violations of law, regulation, rule, firm policy, or other audit requirements or data. In some implementations, the known ChatGPT model can be augmented by training on complete/incomplete responses, and such augmented models used to evaluate RR answers, and request follow up information-which can occur immediately or be communicated to an RR e-mail or other contact information associated with an RR.

Figure 10:
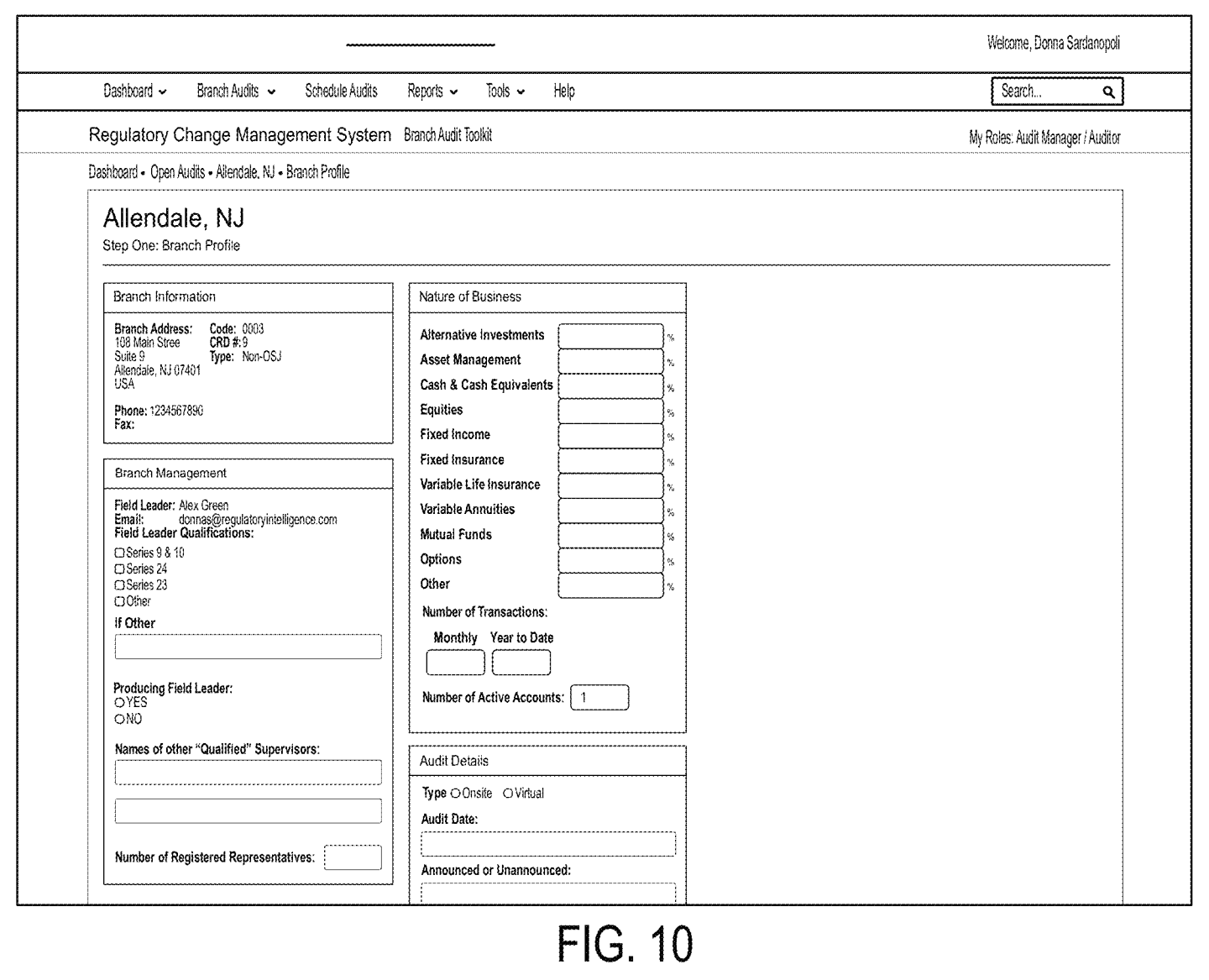

According to some embodiments, audit functions and/or questions are tailored to a specific audit target. In the FINRA context, the branch type can be used to tailor questions and required information to respective branch types. In one example, the system can maintain information on an audit target and save that information as a branch profile (e.g., FIG. 10—interface for entering profile information). In other examples, the compliance system can be connected to a client system via a local program or application programming interface ("API") that is configured to prepopulate branch specific information from client systems. In other examples, branch specific information can be managed by a client/user and can be entered into the system by an auditor or audit manager, among other options. For example, the following information can be pre-populated through API:
  a. Branch address
  b. BOM name
  c. BOM email address
  d. CRD number
  e. Others In some examples, the above information can be captured as part of client registration or authorization processing. In other examples, local programs (e.g., API) can be used to capture information on a client system and pre-populate information for respective audit targets automatically.

According to one embodiment, once a client is registered and branch profile information provided, the system can execute scheduler functionality, for example, that can be viewed by an audit manager to schedule or confirm an automatic schedule for executing respective branch audits. In various embodiments, the system automatically identifies audit target locations, predicts how long each audit, audit step, or steps will take for a respective target and harmonizes the execution of the entire audit process to ensure compliance across any number of audit targets. The ability to harmonize scheduling and execution automatically for a client having ten, hundreds or even thousands of audit locations and respondents provides functionality unavailable in conventional approaches. For example, trained scheduling models can identify audit location or respondents that have historically used more time, and adapt scheduling accordingly. Similarly, responsive audit targets and respondents can be evaluated by the AI model for scheduling. In still other examples, the AI model can evaluate a proposed schedule and link prior performance to specific time-period (e.g., vacation heavy times, leave periods, etc.) enabling the scheduling AI to anticipate and adapt to circumstances not even perceived at respective audit target locations.

Figure 5:
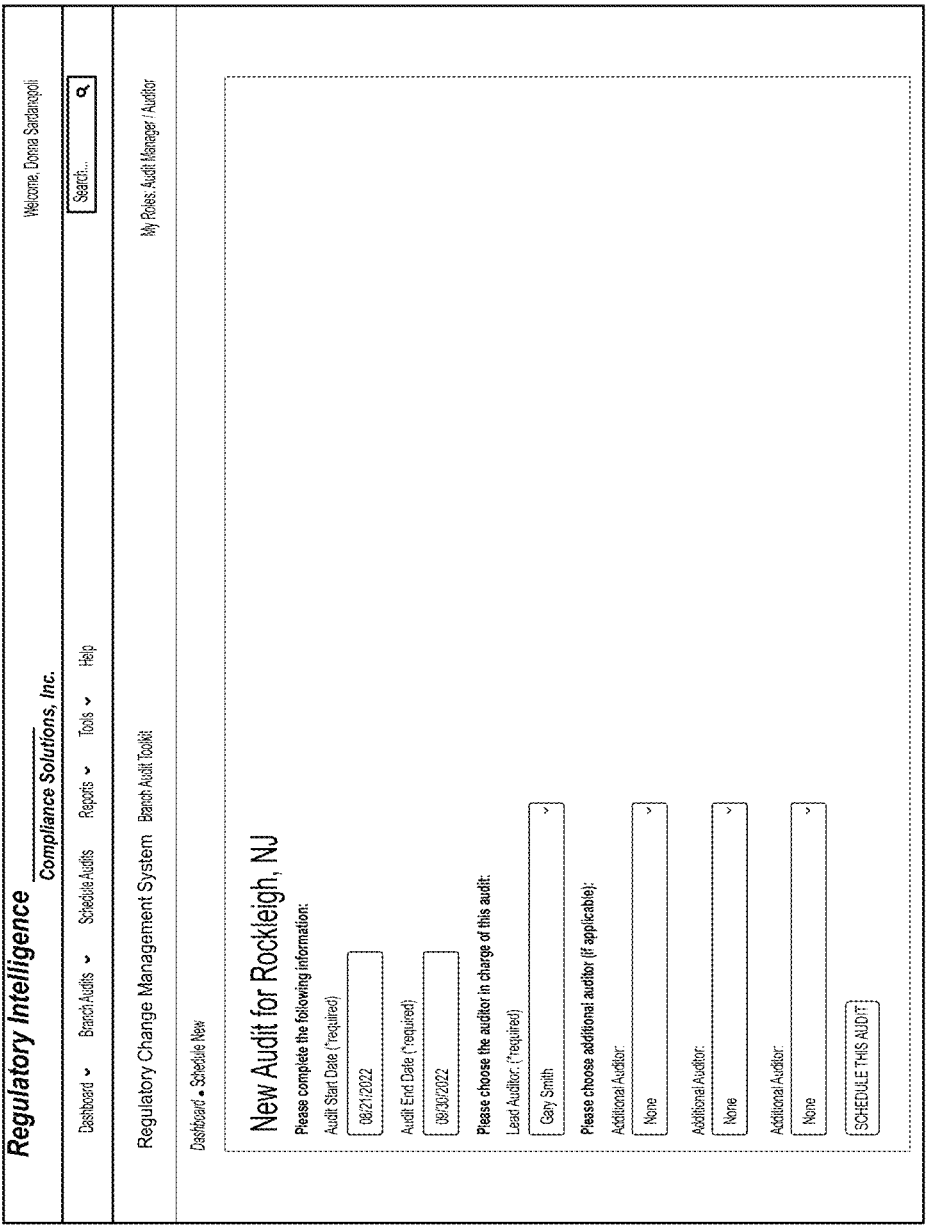

In some embodiments, the system is configured to enable an audit manager to utilize any of the filters provided (i.e., type of branch location, state, city, region etc.) to simplify the process and comply with the regulatory timeframe to complete the audits. In various examples, the system and AI models are configured to identify upcoming deadlines for required branch audits and plan a comprehensive rolling audit schedule, based on the client's (e.g., a firm's) existing audit cycle. FIGS. 4 and 5 show example screen captures and user interfaces for displaying and building an audit schedule in conjunction with AI inputs.

According to one embodiment, the system is configured to define a timeline based on FINRA regulatory requirements (e.g., stored on the system) for each type of audit target. In the FINRA examples, audit targets include branch type (i.e., OSJ; Non-OSJ; NBL), and the AI scheduler is trained to extrapolate a schedule from a date of last completed branch audit. In further embodiments, the system is also configured to follow optional rules or requirements—for example, FINRA National Examination Risk Alert, Volume 1, Issue 2 speaks to the fact that member firm's characteristics of good supervisory procedures for branch office inspections should include the use of unannounced branch inspections. Although the firms under audit requirements are only urged to perform a certain percentage of unannounced Audits per audit cycle, the system can include unannounced audits as part of an audit schedule, limiting access to unannounced audit processes based on user role (e.g., audit manager). In various examples, the user interface is configured to highlight optional activities and, for example, request an audit manager confirm their inclusion (e.g., generally as authorizing optional rules/activities, and/or specifically for each scheduled optional event, among other options).

According to some embodiments, an audit schedule display includes features based on the number of days left to perform the required audit/action and is highlighted by color coding (i.e. RED—within 30 days, YELLOW within 60 days and GREEN more than 60 days. Example screen captures are shown in FIGS. 4-18. Various times frames can be defined on the system and presented in different displays. In some examples, the system and AI models can define time frames based on historic responses/resolutions of issues, and/or completion timelines observed in prior audits or compliance reviews. In other examples, users may define time frames as preferences on the system.

According to other embodiments, a client can customize deadlines for reporting based on preference, and/or update a candidate scheduled. The system can be configured to advise on changes and potential impact on compliance, and preserve the option for users with privileges to override any considerations (e.g., audit manager). In various embodiments, the AI model is configured to schedule an audit date, users with privileges (e.g., audit manager) can re-schedule or even eliminate scheduled tasks. In some examples, the system is configured to generate and communicate emails to an Audit Manager (bi-weekly or monthly, which can be defined differently based on Client preference) detailing the specific branches due to be examined. In various examples, LLM models and/or SLMs can be used to generate contextually specific communications to respective users supervising an audit process.

According to one example, the system is configured to capture and embed contextual information into such communications, and may include a list of branches in (e.g., the body of) the email (not as an attachment) and the displayed information can be filtered by upcoming due date (ascending). In other examples, the AI model is configured to generate emails based on the priority/color coding associated with due dates. Audit targets (e.g., branches) can be organized by country, state, region, BOM, etc. In various communication examples, the system and/or AI model is configured to generate messages that include the name(s) of prior Auditors and Audit Manager with an (*) or other form of highlight.

In various embodiments, the system is configured to evaluate risk and enable users (e.g., audit manager) to manage risk proactively. For example, the system and AI models are configured to enable an audit manager to identify systemic issues based on branch, branch personnel and/or prior Auditors and Audit Manager(s). The AI models can be trained on patterns that are indicative of violations, borderline compliance, or lack of audit information at respective audit locations. The system/AI can be configured to highlight this information and, in some cases, predict which audit targets are likely to have associated issues, or need additional follow up to complete audit activity, among other options.

In some examples, AI models are trained to identify patterns of violations in prior audit data and highlighted on the system via a risk report. The risk report has built in algorithms/logic. When visualizing a report, the AI model is configured to arrange information based on order of importance (e.g., linking pattern match data to potential issues, and ordering based on similarity to the same, among other options). The display can include selectable filters (e.g., Date Range, State(s), Region(s), Nationwide, Closed and/or archived audits). Responsive to filter selection, the system is configured to drill down displayed information into violations within each Audit chapter and drill down again to the actual questions in each chapter (e.g., FIGS. 16 and 17). The UI is specially configured to link and display the associated details where there are patterns of violations and excess. Further the AI model can assign priority to respective details and order the UI displays accordingly. FIG. 4-18 illustrate display options, and the system is configured to drill down displayed information into specific issues/violations that can be defined and can be organized by audit chapter. FIGS. 4 and 9 illustrates example dashboard schedule interfaces and FIG. 5 an example interface for creating a new audit. The system enables users to drill down to the actual questions in each chapter (e.g., FIG. 12), and review additional information on each based on drilling down again to the actual branch location(s) and then click into the actual audit location to view the details. The system is further configured to manage and organize audit information. For example, if a reviewed audit is an audit having a closed status, the system is configured to display the actual audit. If the audit has an archived status, the system is configured to display an archive folder which enables and organizes access to all applicable documents and reports associated with a respective audit. The UI is specially configured to link and display the associated details where there are patterns of violations and/or excess.

In further embodiments, AI models can be trained to identify patterns of compliance (e.g., no violation), as well as having models trained on patterns representing a "lack" of violation (e.g., inverse patterns). The system can be configured to detect both options and make assessments on either both, or combinations. In one example, the system executes logic to drill down to the chapter organization of information, and include analysis of questions/answers that have not had violations. The user interface can be configured to organize the information on chapters, questions, and group the information within certain chapters/questions based on any date range or filters chosen, and may also highlight patterns for violation, compliance, or lack of either.

According to some embodiments, the visualizations in the user interface enable users (e.g., Audit Managers) to identify patterns of excess or lacking audit findings at specific branches. The system is configured to facilitate utilization efficiencies for consulting Clients, and to incorporate those efficiencies into streamline UI displays.

According to some embodiments, the system is configured to raise flags or communicate audit results when an AI Model determines a prior audit exceeded certain threshold levels of findings and required Corrective Action Plans. In some examples, a client can specify the thresholds associated with findings and corrective actions. At the end stages of an audit, all audit targets (e.g., and respective branch audits) are assigned a closed status, which triggers the system to archive the audit and associated risk rating (e.g., High, Medium; Low). The end stage can be managed by the system to require that a user (e.g., the BOM) complete a corrective action report, and submit the report to the auditor, prior to archiving the audit. In some examples, an AI model is trained to evaluate the results (e.g., risk rating) to determine whether an Audit Manager must be notified of and receive the results of such prior Branch Audit Reports.

In some examples, a risk rating model is based on the total number of violations identified throughout the audit, and labels assigned to the historic data. AI models are trained on recommended ranges for High, Med and Low) (e.g., low for 3 or less violations; Med. for 4-8 violations; High for 9 or more violations). Various embodiments enable clients to set specific thresholds for each risk rating, and/or supply labeled data for augmenting trained models.

In further embodiments, a risk rating model is trained to historic reviews and identification of issues. In some examples, risk factors can be identified through historic inputs and analysis. Currently, the system is configured to assign a color-coding risk factor for each violation red-High, Orange-Moderate, Yellow-Low. (See FIG. 6).

The system is configured with execution logic to control management operations. For example, in response an identified risk the system can classify based on context: e.g., a registered representative having outside brokerage accounts that were not approved by compliance and thus not being reviewed by the firm they are employed at—is assigned a very high risk; if registered representative performs an Outside Business Activity (OBA) that the firm is not aware of, where the OBA was not reviewed and approved by the firm—is assigned a high-risk rating. The number of similar violations can be used to decrease/increase a risk rating. For example, if the same activity occurs multiple times across a firm, it can be a systemic problem which then the AI would need to determine if there are issues with the firm's policy or certain supervisory personnel that are not performing the required reviews.

According to various embodiments, the system and AI models are configured to build a set of requests for additional information based on questionnaires, interviews, etc. In some examples, the system enables a privileged user (e.g., Auditor) to define an audit period/deadline for each responsive item (e.g., listed in a document request list "DRL"). In one example, an AI model is configured to pre-determine the audit period for each responsive item based on the information provided in the branch profile and other audit preparation documents (e.g., client defined requirements). Time periods can be based on type of business, number of RR's, number of transactions, etc., and the system/AI can be configured to email any DRL directly to a BOM including associated deadlines.

According to some embodiments, an Auditor can use the system to interview a BOM directly (e.g., in-person or zoom), and/or communicate a Questionnaire (Word doc) to the BOM via email to complete (based on Client preference). In some examples, each client is able to define how an audit should be executed via settings defined on the system (e.g., client defines if the Auditor interviews BOM or whether the BOM will complete the questionnaire without an interview. For example, the client may opt for (a) In-Person Interview; (b) Questionnaire Only or (c) combination of the two). In response to client settings the system/AI is configured to generate an email and attach a questionnaire (.pdf) and automatically send it to the BOM. Where Client indicates "In-Person Interview," the system or Auditor can schedule the interview. In further embodiments, the system can execute AI models to perform the "in-person interview" via video (e.g., zoom conference with AI avatar display and voice prompts) or telephone (e.g., voice AI reads questions to BOM). The AI can be configured to review BOM responses and assess for completeness/accuracy. AI will draft follow-up questions, where required, and assess for completeness/accuracy. In some examples, the AI model is trained the same way as for the actual body of the audit. For example, the AI can be trained on the SEC rules, FINRA Rules, SEC/FINRA prior disciplinary actions, FINRA Regulatory Notices, SEC proposed Rules, SEC releases etc., as it relates the BOM's responsibility for Supervision of the branch office.

In some embodiments, the system enables a user (e.g., the Auditor) to select modules to be utilized for each audit, and the modules can be displayed based on the type of branch (e.g., OSJ, NON-OSJ, NBL, Residence). In other examples, an AI model is trained to identify and select a type of branch (e.g., OSJ, NON-OSJ, NBL, Residence) and type of audit (Announced vs. Unannounced) automatically. In other examples, the AI model is configured to identify and select the specific modules applicable to that type of audit. As discussed above, profile information can be used by the system to identify audit target types (e.g., received via API during the Client account set-up process). In some embodiments, the system is configured to identify present required modules using automatic blue check boxes. An Audit Manager user retains the option to add additional, non-required options by manually clicking additional module boxes. In some settings, an audit manager can override selections.

Figure 11:
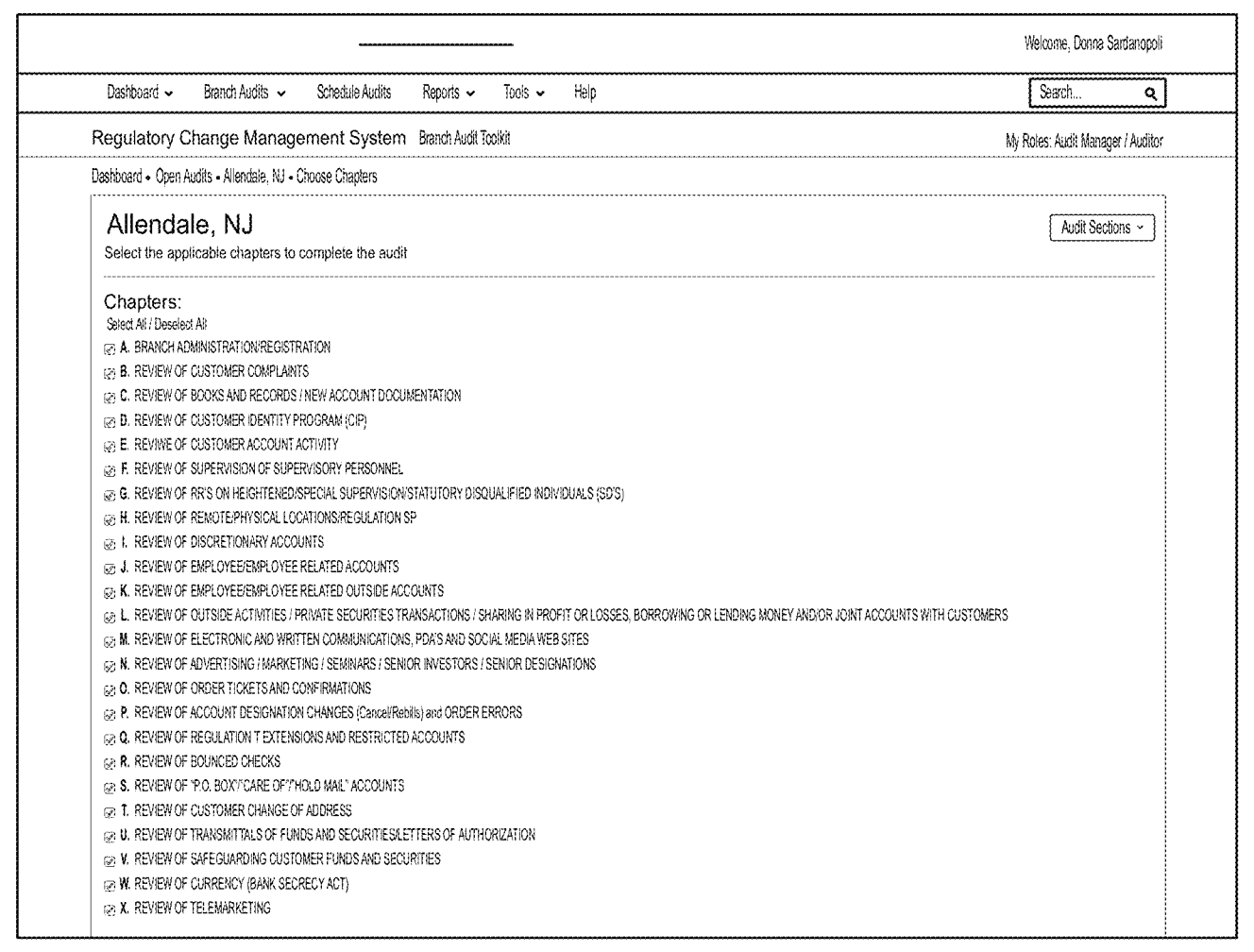

In one example, system is configured to organize displays to include a drop-down menu itemizing type of branch (e.g., OSJ, NON-OSJ, NBL, Residence, etc.) this drop-down menu can be place on the chapter selection page (e.g., FIG. 7). Example AI models are trained on what reviews are required for each branch type. FINRA Rule 3110(c) Inspections (e.g., FIGS. 4, 7, 8, and 9) discusses at a minimum what is required (FIG. 8 (A) if applicable . . . through (D)). Once AI selects branch type in the dropdown menu, the system is configured to generate the applicable chapter organizations needed for that specific Branch Audit. FIG. 11 illustrates an interface for displaying a generated chapter organization.

In various embodiments, the system facilitates an Auditor user's execution of an entire audit (e.g., reviews documents and assesses if there is a regulatory rule violation and/or firm procedure violation). In other embodiments, AI models are trained to all the rules, regulations and audit steps that enable the AI to perform/analyze the review and determine if there are any issues and/or violations. For example, the system can provide AI that is configured to replace the Auditor user and perform the actual audit.

In the final stages of an audit, conventionally an auditor is expected to perform an attestation, swearing that the audit is complete, correct, and all procedures have been followed with appropriate documentation that has been reviewed. In some embodiments, the system is configured to facilitate an auditor's review and attestation, compiling information, evidence, rules, requirements, etc., so that the auditor can quickly review and attest to the validity of a respective audit. In other embodiments, AI models configured to attest via check box that all applicable chapters for an audit target (e.g., relevant to a Branch Audit) have been completed, that the audit procedures were followed, and that any and all appropriate documentation has been reviewed (e.g., is included in the audit report). The system/AI can automatically update a selection status associated with the audit (e.g., when visualized) the UI will indicate a selected "I Accept" button—and the status of the audit is updated to closed.

In some embodiments, the system/AI is configured to generate an email alert to the BOM, Auditor and Audit Manager upon closing. In one example, the communication can include the following language (e.g., based on recipient):

BOM email:
The audit for _____ has been closed by the auditor. They will follow up with a report of any violations found. If violations have been found, you will have 7 days to respond to these violations. Once reviewed by the auditor, you will be asked to provide any corrective actions that you have taken to remedy the violations.

Auditor and Audit Manager email:
Congratulations! Your branch audit is complete and has been moved to your "Closed Audits". You can now view and print a detailed report (Audit Report) of the completed review, and a separate detailed report of all Violations (Violation Report)

In further embodiments, the system is configured to build a violation report specifying issues that may need follow up or remediation. For example, once the closed branch audit appears in the Closed Audit File the auditor sends the Digital Violation Report/Tracker to the BOM. In one example, responsive to the closed branch audit transition to the Closed Audit File, the system/AI will send an email to the BOM that contains a link and access code to the digital Violation Report. In another example, responsive to Client's selection, the Auditor may review the Violation Report and then manually send it to the BOM (which can allow for human interaction or AI guided interaction).

In some embodiments, the system facilitates user (e.g., the Auditor) evaluation of the BOM's Initial Response and whether the auditor or the system can communicate whether the response(s) are sufficient. According to one embodiment, the system executes AI models trained to evaluate the BOM Initial Response(s) and any BOM Corrective Action Response to determine if the response and actual/proposed corrective action is sufficient to meet regulatory and/or firm compliance obligations. In both cases the AI will accept or reject the BOM'S responses automatically. In some examples, the system and AI models can interact with respondents on response, providing guided chat sessions and/or evaluations of responses in real time. For example, a trained model can accept user input responses, and provide back audio commentary (e.g., text to speech commentary or addition requests) as part of evaluation. In one example, the system/AI model provides a chat interface that requests BOM response(s) and validates them as they are entered—the system/AI model can be configured to trigger follow up immediately for invalid, ambiguous, or unverified responses.

According to one example, if the information contained in the BOM Initial Response is not sufficient, the system/AI model is configured to suggest alternative actions (e.g., either in a separate window or auto-populate in the original response and corrective action window). In further examples, the system executes AI models trained to review and confirm that any final actions meet regulatory and/or firm compliance obligations to resolve violations or issues.

In some embodiments, an auditor user reviews all corrective actions and confirms they are sufficient and then archive the report. The AI analysis can be used in an advisory mode, where the AI determination (e.g., sufficient, invalid, insufficient, etc.) can be displayed in associated with a violation, and provide drill down visualizations having associated rules and/or requirement displays, evidence of violation, and evidence of remediation actions, etc. In other embodiments, the AI model evaluation is used directly, and the output of the AI model can be used by the system to accept the BOM Initial Response and Corrective Action Response. Client users can define what option is used by the system (advisory mode, accept mode, or hybrid). Once the evaluation is complete, the system/AI model is configured to risk rank the audit target (e.g., branch office) based on any violations (e.g., Low, Medium, High), any remediation, and then archive the audit. Below are described example entities and definitions that can be used in conjunction with FINRA based audit execution. FIGS. 4-18 illustrate screen captures of compliance interfaces and example functionality provided as part of audit execution. The screen captures can be used in conjunction with audit execution and provide a walkthrough of functionality made available in various embodiments of the systems.

In various embodiments, the system is configured to perform automatic audits for compliance with any input rules, regulations, and/or requirements. For example, the system can be configured to accept requirements from a certifying authority, automatically execute a review of a compliance target and/or associated systems based on the accepted requirements. In various examples, a set of regulations, rules, and/or requirements or portions thereof can be used as an input to a large language model coupled with a request to produce review criteria that can be used to determined compliance. Other embodiments can use the rules, regulations, and/or requirements directly to identify whether or not a target is in compliance.

In one embodiment, the system parses a set of rules, regulations, and/or requirements in steps, and evaluates each rule, regulation, and/or requirement for compliance against a target or based on generating questions and requesting responses for a responding user. As discussed above, in some examples, the determination of compliance may require input from an audit target and/or party responsible for responding to audit questions (e.g., RR, or other registered/authorized user, etc.). While in other examples, various rules, regulations, and/or requirements can be evaluated for compliance by providing each to an AI model to determine compliance. In one example, the system includes LLM and/or SLM models tailored to specific rules, regulations, and/or requirements, and the system can link the tailored models to specific context and use the associated LLM and/or SLM based on information provided with an audit/ compliance request. In still other embodiments, the rules, regulations, and/or requirements can be linked to specific contexts and tailored model selected based on the associated rules, regulations, and/or requirements.

In some examples, the system can evaluate documents provided as part of compliance evaluation against the set of rules, regulations, and/or requirements. In other examples, the system can evaluate information obtained from systems, databased, or other computer-based resources to determine compliance. In still other embodiments, additional AI models can be used to capture information that is to be evaluated for compliance. In other embodiments, context information can be used to select AI models that are tailored to retrieve information on computer system, information stored on computer system, derive information associated with compliance targets and/or systems, among options. Once the information is retrieved, the system can execute AI models (e.g., LLMs, SLMs, etc.) that evaluate a set of rules, regulations, and/or requirements against the retrieved information to determine compliance, and/or where additional information is required to determine compliance.

Example Compliance Environments

According to various embodiments, the system is configured to execute reviews (e.g., audits) related to evaluations of rules, regulations, and/or requirements for environmental, social, and governance ("ESG"), insurance, accounting, sustainability, construction, aerospace, manufacturing, healthcare, pharmaceutical, energy, telecommunications, and information technology sectors and industries.

Also includes any audit or other automated review that uses AI to identify violations or gaps based on promulgated standards, industry standards (e.g., promulgated by non-government entities, industry trade groups, not-for-profit organizations and other professional organizations, etc.). In various embodiments, the system can be configured to capture any such standards, and use them as a basis for evaluating compliance. For example, the system can leverage any requirements, rules, and/or regulations defined by any standard for a sector/industry practice, guideline, framework, and/or reporting initiative. For illustration purposes, examples of such organizations include, but are not limited to:

(i) The International Financial Reporting Standards (IFRS) (and its related and affiliated entities), which develops globally accepted accounting and sustainability disclosure standards;
(ii) the International Sustainability Standards Board (ISSB) of the IFRS Foundation, which oversees the SASB Standards;
(iii) the Financial Accounting Standards Board (FASB), which establishes financial accounting and reporting standards for public and private companies and not-for-profit organizations that follow Generally Accepted Accounting Principles (GAAP);
(iv) the International Organization for Standardization (IOS), which develops and publishes international standards in all technical and nontechnical fields;
(v) the American Productivity & Quality Center (APQC), which focuses on benchmarking, best practices, process and performance improvement, and knowledge management across multiple sectors and industries;
(vi) the Information Systems Audit and Control Association (ISACA); and
(vii) The Committee of Sponsoring Organizations of the Treadway Commission (COSO), which creates comprehensive frameworks and guidance on enterprise risk management, internal control, and fraud deterrence;
(viii) Americans with Disabilities Act (ADA) and requirements for accessibility, including for example WCAG;
(ix) Section 508 compliance, EN 301 549 compliance, AODA, etc.

Example Implementation

In some embodiments, the Audit Manager may decide which, if any, AI features to enable for one or more audits. For example, the system can accept user specification of authority to enable an Audit Manager to assign AI enabling rights to one more Auditors. (e.g., FIG. 20).

In some embodiments the AI model is configured to operate as the actual auditor, in whole or in part, for certain reviews or audits where such functionality is selected by the user. With some embodiments of the present system, such usability will be managed via the AI Manager dashboard (e.g., FIG. 20), whereby the user may opt to allow the AI to perform all or part of the audit based on certain factors including due date (color-based according to days remaining before required completion date), or the location of the branch based on region or state, among other factors. Other embodiment can be configured with AI operations set active by default (e.g., which can be disable via the Manager interface).

In other embodiments, where the user opts for the AI to act as the auditor, the AI will select the type of audit to be performed based on branch type (e.g., OSJ, non-OSJ, NBL) and/or audit type (e.g., announced, unannounced). The AI will then identify and select specific audit chapters to be used based on the selections.

In other embodiments, the AI will generate and send a tailored Document Request List to the BOM and predetermine the audit period for each responsive item.

In other embodiments, the AI will generate a risk rating for the branch or business being audited (e.g., High, Medium, Low). Such rating will be based on a variety of factors, including but not limited to: (i) prior audit results; (ii) branch personnel; and (iii) the type of business being conducted at the location.

With embodiments of the present system, the AI is configured to analyze the information and documentation submitted in connection with the BOM Questionnaire, RR Questionnaire, and Document Request List and identify the specific audit modules to be utilized in the review. Here, the AI will replace the human auditor and perform the actual audit. The AI will identify the completion of the audit and attest to the completeness of the audit. The AI will then generate an email to the BOM, and where applicable, attach a copy of the violation report that summarized the violations identified in the audit.

In other embodiments, the AI will close the audit, assign a risk rating based on the audit findings and archive both the risk rating and audit.

Example Rules for Evaluation:

(c) Internal Inspections (1) Each member shall conduct a review, at least annually (on a calendar-year basis), of the businesses in which it engages. The review shall be reasonably designed to assist the member in detecting and preventing violations of, and achieving compliance with, applicable securities laws and regulations, and with applicable FINRA rules. Each member shall review the activities of each office, which shall include the periodic examination of customer accounts to detect and prevent irregularities or abuses. Each member shall also retain a written record of the date upon which each review and inspection is conducted.

(A) Each member shall inspect at least annually (on a calendar-year basis) every OSJ and any branch office that supervises one or more non-branch locations.

(B) Each member shall inspect at least every three years every branch office that does not supervise one or more non-branch locations. In establishing how often to inspect each non-supervisory branch office, the member shall consider whether the nature and complexity of the securities activities for which the location is responsible, the volume of business done at the location, and the number of associated persons assigned to the location require the non-supervisory branch office to be inspected more frequently than every three years. If a member establishes a more frequent inspection cycle, the member must ensure that at least every three years, the inspection requirements enumerated in paragraph (c)(2) have been met. The member's written supervisory and inspection procedures shall set forth the non-supervisory branch office examination cycle, an explanation of the factors the member used in determining the frequency of the examinations in the cycle, and the manner in which a member will comply with paragraph (c)(2) if using more frequent inspections than every three years.

(C) Each member shall inspect on a regular periodic schedule every non-branch location. In establishing such schedule, the member shall consider the nature and complexity of the securities activities for which the location is responsible and the nature and extent of contact with customers. The member's written supervisory and inspection procedures shall set forth the schedule and an explanation regarding how the member determined the frequency of the examination.

(2) An inspection and review by a member pursuant to paragraph (c)(1) must be reduced to a written report and kept on file by the member for a minimum of three years, unless the inspection is being conducted pursuant to paragraph (c)(1)(C) and the regular periodic schedule is longer than a three-year cycle, in which case the report must be kept on file at least until the next inspection report has been written.

(A) If applicable to the location being inspected, that location's written inspection report must include, without limitation, the testing and verification of the member's policies and procedures, including supervisory policies and procedures in the following areas:

(i) safeguarding of customer funds and securities;

(ii) maintaining books and records;

(iii) supervision of supervisory personnel;

(iv) transmittals of funds (e.g., wires or checks, etc.) or securities from customers to third party accounts; from customer accounts to outside entities (e.g., banks, investment companies, etc.); from customer accounts to locations other than a customer's primary residence (e.g., post office box, "in care of" accounts, alternate address, etc.); and between customers and registered representatives, including the hand-delivery of checks; and (v) changes of customer account information, including address and investment objectives changes and validation of such changes.

(B) The policies and procedures required by paragraph (c)(2)(A)(iv) must include a means or method of customer confirmation, notification, or follow-up that can be documented. Members may use reasonable risk-based criteria to determine the authenticity of the transmittal instructions.

(C) The policies and procedures required by paragraph (c)(2)(A)(v) must include, for each change processed, a means or method of customer confirmation, notification, or follow-up that can be documented and that complies with SEA Rules 17a-3(a)(17)(i)(B)(2) and 17a-3(a)(17)(i)(B)(3).

(D) If a member does not engage in all of the activities enumerated in paragraphs (c)(2)(A)(i) through (c)(2)(A)(v) at the location being inspected, the member must identify those activities in the member's written supervisory procedures or the location's written inspection report and document in the member's written supervisory procedures or the location's written inspection report that supervisory policies and procedures for such activities must be in place at that location before the member can engage in them.

(3) For each inspection conducted pursuant to paragraph (c), a member must:

(A) have procedures reasonably designed to prevent the effectiveness of the inspections required pursuant to paragraph (c)(1) of this Rule from being compromised due to the conflicts of interest that may be present with respect to the location being inspected, including but not limited to, economic, commercial, or financial interests in the associated persons and businesses being inspected; and (B) ensure that the person conducting an inspection pursuant to paragraph (c)(1) is not an associated person assigned to the location or is not directly or indirectly supervised by, or otherwise reporting to, an associated person assigned to the location.

(C) If a member determines that compliance with paragraph (c)(3)(B) is not possible either because of a member's size or its business model, the member must document in the inspection report both the factors the member used to make its determination and how the inspection otherwise complies with paragraph (c)(1).

The following entities and definitions can be used in conjunction with embodiments of a FINRA based audit execution:

a. Office of Supervisory Jurisdiction (OSJ):

OSJs are subject to an annual inspection, and each OSJ must have a registered principal who carries out the supervisory responsibilities for that office.

OSJ means any office of a member at which any one or more of the following functions take place:
  (A) order execution or market making;
  (B) structuring of public offerings or private placements;
  (C) maintaining custody of customers' funds or securities;
  (D) final acceptance (approval) of new accounts on behalf of the member;
  (E) review and endorsement of customer orders, pursuant to paragraph (b)(2) above;
  (F) final approval of retail communications for use by persons associated with the member, pursuant to Rule 2210(b)(1), except for an office that solely conducts final approval of research reports; or
  (G) responsibility for supervising the activities of persons associated with the member at one or more other branch offices of the member.

b. Non-Office of Supervisory Jurisdiction (NON-OSJ):

Branch office that does not supervise one or more non-branch locations.

c. Non-Branch Location (NBL)

Can be a certain location and/or primary residence used for securities business d. Residence:

Primary residence used for securities business more than 30 days annually

B. Players a. Auditor(s):

A firm employee who performs audit of the branch office. Auditors report to the Audit Manager b. Audit Manager:

A firm employee who oversees one or more branch office audits. Audit Managers supervise Auditors, who perform the actual branch audits.

c. Branch Officer Manager (BOM):

Person in charge of the branch Office. The BOM can also be a registered representative who performs securities business.

d. Registered Representative (RR):

An employee engaged in the solicitation or handling of accounts or orders for the purchase or sale of securities, or other similar instruments for the accounts of customers of his employer or in the solicitation or handling of business in connection with investment advisory or investment management services furnished on a fee basis by his employer.

C. Document Types
  a. Branch Office Manager Interview ("BOM Interview")
  b. Branch Office Manager Initial Response ("BOM Initial Response")
  c. Branch Office Manager Questionnaire ("BOM Questionnaire")
  d. Document Request List
  e. Registered Representative Questionnaire ("RRQ")

D. Report Types
  a. Audit Report
  b. Branch Office Manager Initial Response ("BOM Response")
  c. Branch Office Manager Corrective Action Response ("BOM Corrective Action Response")
  d. Violations Report E. Miscellaneous
  a. Client:

Refers to system users.
  b. Financial Industry Regulatory Authority (FINRA) Rule 3110

Also known as the Supervision Rule, requires brokerage firms to diligently supervise the activities of their registered representatives to ensure that they comply with FINRA and SEC rules and regulations, as well as federal and state laws. To comply with Rule 3110, each firm is required to draft a set of written supervisory procedures and appoint designated supervisors to enforce them. These supervisors, known as "supervisory principals", are required to obtain a special supervisory license.

Example Question from Registered Representative Questionnaire:

"Have you engaged in any outside business activities . . . "

With the following answer from respondent (e.g., via interface, voice, etc.):

"I am a licensed real estate agent and work on weekends"

Example AI output is as follows:

"The client's response implies involvement in an outside business activity. As per FINRA Rule 3270, this needs to be disclosed in written notice to their member firm. Although the client mentions their role as a licensed real estate agent, crucial details such as the expected or received compensation, the nature of the activity, and its compatibility with the broker-dealer's responsibilities are not provided."

In some embodiments, the AI output can be provided to an Auditor user via a display with automatically generated follow up questions. In other embodiments, the AI output is used to generate follow up questions automatically and present those follow up questions directly in a visualization of the survey, enabling the system to dynamically update the requests based on responses received. In still other embodiments, the AI model can be configured to immediately generate, and present follow up questions, and in still other embodiments, the assessment and evaluation information can be saved as data for display in a report generated for audit or other compliance review.

Next Steps (for example, executed by the system/AI):
  Request more detailed information from the client about their real estate activity. This should include details about their responsibilities, the hours they work, whether the work is conducted at the broker dealer's office, and whether they receive any form of compensation.
  Once this information is provided, review it against Rule 3270 and Rule 3110 to determine if the activity interferes or compromises the registered person's responsibilities to the member firm and/or its customers. System evaluates the nature of the proposed activity and the manner in which it will be offered to evaluate if it could be viewed as part of the firm's business by customers or the public.
  If necessary, the system can trigger a human based review of AI analysis—for example, system can trigger notifications to consult with the Auditor and/or Audit Manager and compare the client's disclosed activities with their record to identify any discrepancies.

System ensures there is prior written notification from the client about this activity on file and that the firm has maintained records in compliance with SEA Rule 17a-4(e)(1). This can include an automatic request for documentation or evidence of prior communication/ authorization.

Based on the review, the firm may need to consider imposing specific conditions or limitations on the client's outside business activity or even prohibiting it.

Example information sources are scanned and/or uploaded to be evaluated by the system and/or AI. For document review examples, the system can be configured to perform a check to test the quality of scans or submitted documents to ensure everything is readable by AI.

Example question that a Broker/RR use to complete in their questionnaire

16—Have you engaged in any outside business activities (i.e., director, officer, controlling stockholder, partner or sole proprietor of, or an associated person of any other company, entity or charitable organization)?

(Detail the activity, hours per week, if you have been compensated and if you perform the outside activity at the broker dealer's office.)

Specific Related Rules and Regs—e.g., Identified by the Trained Model

FINRA Rule 3270

No registered person may be an employee, independent contractor, sole proprietor, officer, director or partner of another person, or be compensated, or have the reasonable expectation of compensation, from any other person as a result of any business activity outside the scope of the relationship with his or her member firm, unless he or she has provided prior written notice to the member, in such form as specified by the member. Passive investments and activities subject to the requirements of FINRA Rule 33280 (See rule Summary for L-6—(an example rule summary display is show in FIG. 13)) shall be exempted from this requirement.

Supplementary Material:

0.01 Obligations of Member Receiving Notice. Upon receipt of a written notice under Rule 3270, a member shall consider whether the proposed activity will: (1) interfere with or otherwise compromise the registered person's responsibilities to the member and/or the member's customers or (2) be viewed by customers or the public as part of the member's business based upon, among other factors, the nature of the proposed activity and the manner in which it will be offered. Based on the member's review of such factors, the member must evaluate the advisability of imposing specific conditions or limitations on a registered person's outside business activity, including where circumstances warrant, prohibiting the activity. A member also must evaluate the proposed activity to determine whether the activity properly is characterized as an outside business activity or whether it should be treated as an outside securities activity subject to the requirements of FINRA Rule 3280. A member must keep a record of its compliance with these obligations with respect to each written notice received and must preserve this record for the period of time and accessibility specified in SEA Rule 17a-4(e)(1).

General Related Rules

FINRA Rule 3110 (a) Supervisory System

Each member shall establish and maintain a system to supervise the activities of each associated person that is reasonably designed to achieve compliance with applicable securities laws and regulations, and with applicable FINRA rules. Final responsibility for proper supervision shall rest with the member. A member's supervisory system shall provide, at a minimum, for the following:

(1) The establishment and maintenance of written procedures as required by this Rule.

(2) The designation, where applicable, of an appropriately registered principal(s) with authority to carry out the supervisory responsibilities of the member for each type of business in which it engages for which registration as a broker-dealer is required.

(4) The designation of one or more appropriately registered principals in each OSJ and one or more appropriately registered representatives or principals in each non-OSJ branch office with authority to carry out the supervisory responsibilities assigned to that office by the member.

(5) The assignment of each registered person to an appropriately registered representative(s) or principal(s) who shall be responsible for supervising that person's activities.

FINRA Rule 3110(b) Written Procedures (1) General Requirements

Each member shall establish, maintain, and enforce written procedures to supervise the types of business in which it engages and the activities of its associated persons that are reasonably designed to achieve compliance with applicable securities laws and regulations, and with applicable FINRA rules.

Example AI Modelled Procedures for Review

Determine through an interview with the Supervisory Personnel (BOM) if any supervisory personnel or any RRs are engaged in Outside Business Activities.

Obtain a list of the RRs who are engaged in Outside Business Activities and compare it to the "RR Questionnaire" in order to determine if there are any discrepancies.

Often times, an RR may disclose Outside Business Activities that the branch was not aware of and therefore, did not approve.

Verify there is prior written notification on file (from the RR) and upon receipt of a written notice under Rule 3270, the firm considered whether the proposed activity:

(1) interferes with or otherwise compromises the registered person's responsibilities to the firm and/or the firm's customers or (2) be viewed by customers or the public as part of the firm's business based upon, among other factors, the nature of the proposed activity and the manner in which it will be offered. Based on the review of such factors, verify evaluation the advisability of imposing specific conditions or limitations on a registered person's outside business activity, including where circumstances warrant, prohibiting the activity.

Also evaluate the proposed activity to determine whether the activity properly is characterized as an outside business activity or whether it should be treated as an outside securities activity subject to the requirements of FINRA Rule 3280.

Ascertain that the firm keeps a record of its compliance with these obligations with respect to each written notice received and this record is preserved for the period of time and accessibility specified in SEA Rule 17a-4(e)(1).

System Evaluates Broker Answer:

I am a licensed real estate agent and work on weekends. Usually work 16 hours on the weekends. If I make a sale, I receive 2% commission on the sale. If I am on the buy side, I also make 2% commission. I am in the process of formulating written notice to the firm.

For example, the AI determines if this is an approved outside business activity. The AI will need to review the branch list of all brokers that have approved outside business activities. If this is not an approved activity this will be a violation of the rule Various embodiments of the compliance system are configured to manage a variety of regulated business. According to one embodiment, the system is configured to manage any regulated business that is required to perform periodic reviews of, or otherwise audit, its business activities to assess compliance with any applicable federal, state or local laws, regulations or rules, including that which may be promulgated by any applicable self-regulatory organization ("SRO") or other governing body.

Each and any requirement specified by any rules or regulation can be provided to the system and used by AI models to provide compliance operations. For example, in the audit context, many regulations/rules apply, and each such regulation can be managed by the system.

In one example, other securities-related audit requirements include:

I. Other Securities-Related Audit Requirements:
  a. Investment Advisers.
    Rule 206(4)-7 under the Investment Advisers Act of 1940 (known as the "Compliance Program Rule") requires each investment company and investment adviser registered with the U. S Securities and Exchange Commission (the "SEC") to:
      (i) adopt and implement written policies and procedures ("WPPs") reasonably designed to prevent violation of the federal securities laws,
      (ii) review (audit) those policies and procedures at least annually for their adequacy and the effectiveness of their implementation, and 206(4)-7 that require all advisers registered with the SEC, regardless of whether they advise private funds, to maintain written documentation of their annual compliance reviews.
      (iii) designate a chief compliance officer ("CCO") to be responsible for administering the policies and procedures.
  b. Investment Companies.
    Similarly, Rule 38a-1 under the Investment Company Act of 1940 (the "1940 Act") requires funds to review their compliance programs, as well of those of their service providers, including their investment advisers (advisers), annually.

Figure 19:
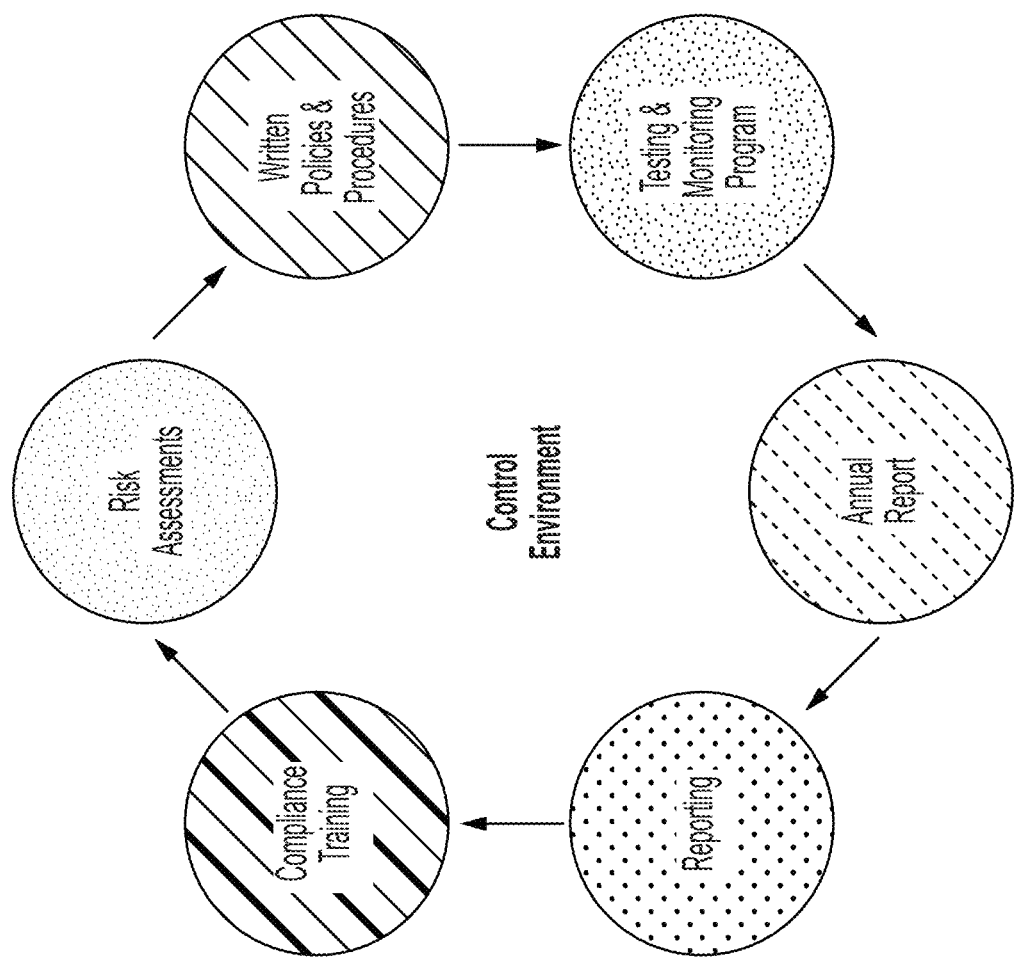
FIG. 19 illustrates an example control environment, according to one embodiment.
Figure 22:
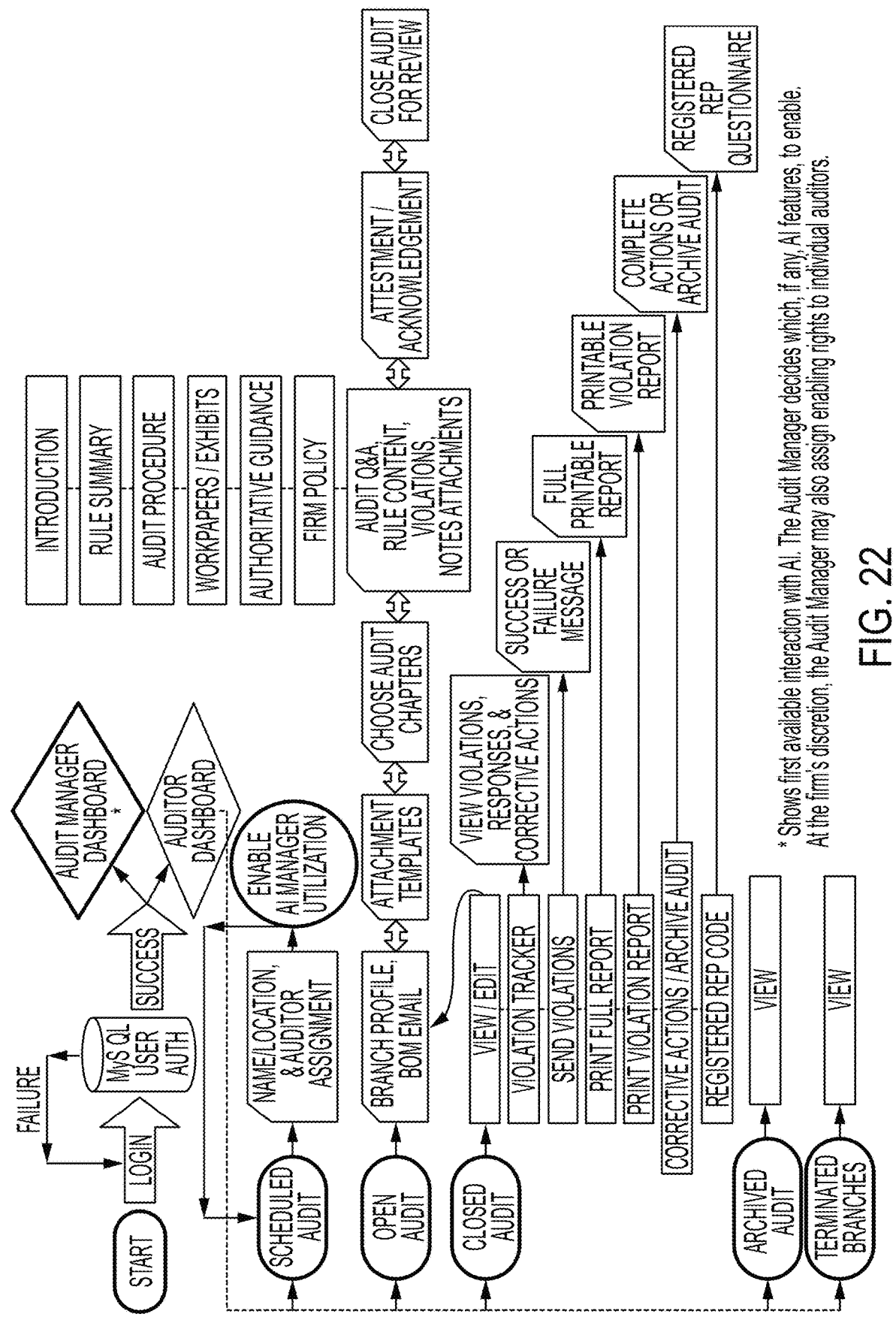
FIG. 22 is an example process flow, according to one embodiment.
Figure 23:
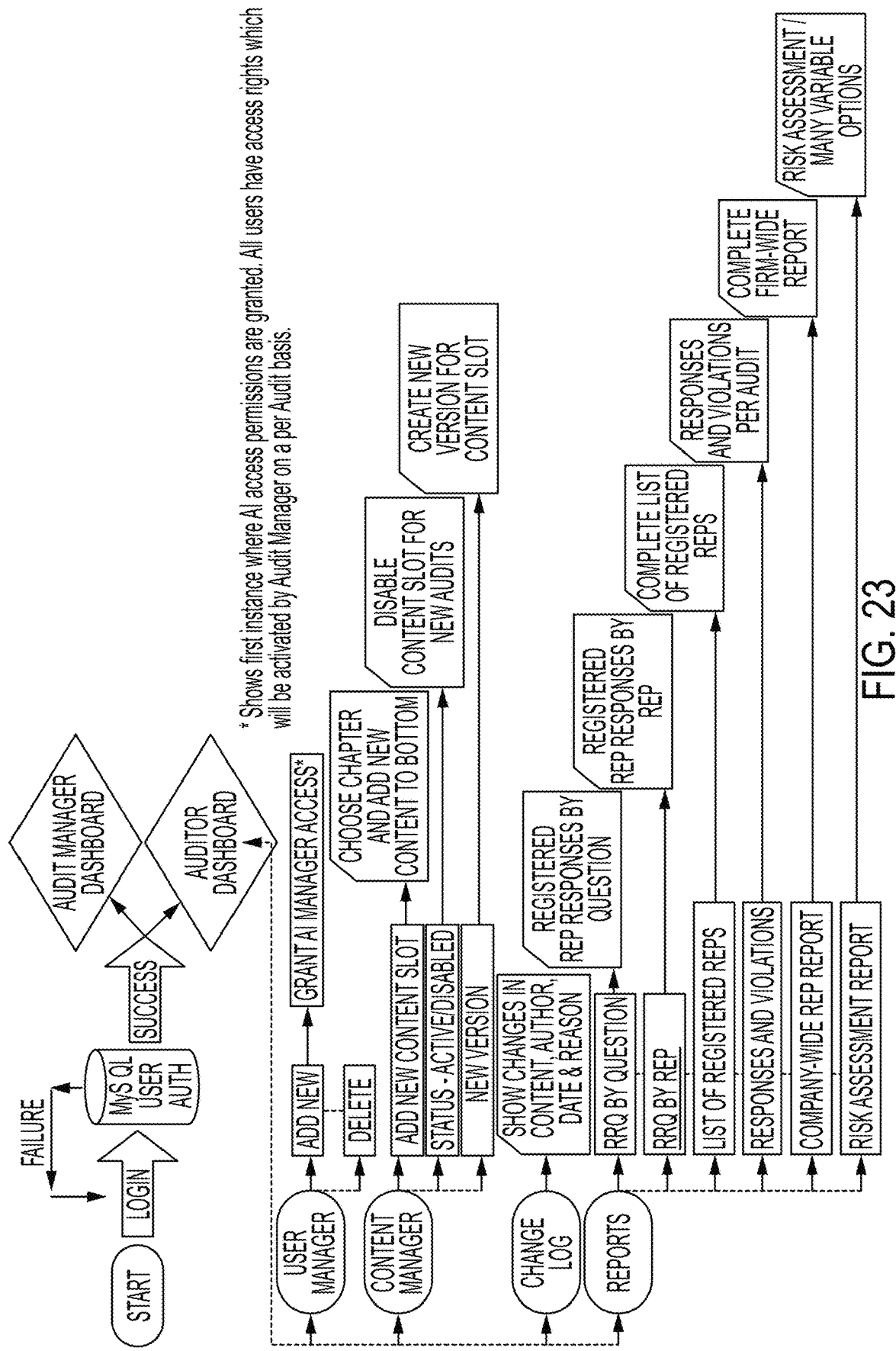
FIG. 23 is an example process flow, according to one embodiment.

To meet these legal and regulatory obligations, the system and/or AI is configured to create and document a customized control environment ("Control Environment") for each firm (that also complies with Advisers Act Rule 204-2 Books and Records requirements), which include six (6) elements (e.g., FIG. 19):

Various embodiments can include any one or more or any combination of the following features to address and manage policy generation and reviews of the same:

1. Risk Assessment
  The System/AI is configured to:
    analyze the type of firm and regulatory requirements based on the firm's registration status (registered investment adviser ("RIA") or registered investment company ("RIC")) and its stated business model and activities model (such as, but not limited to, private equity adviser, business development company, etc.).
    In certain instances, the AI will pull information on the firm from public filings to determine regulatory requirements.
    identify specific risk areas for the business (including, but not limited, to marketing, disclosures, conflicts of interest, etc.) and then rate each risk (e.g., High, Medium Low) based on the firm's business model and activities.
    generate a detailed Risk Assessment Report ("RAR") that summarizes SEC-related risks
2. Written Policies and Procedures ("WPPs")
  The System/AI is configured to:
    review and compare each firm's written Compliance policies and procedures ("WPPs") to identify compliance gaps between those WPPs and governing law, rules, regulations, regulatory guidance, as well as industry best practices.
    generate a gap analysis that identifies specific Compliance topics that require a WPP.
    make WPP recommendations and draft a customized WPP template for each identified missing policy based on regulatory requirements and/or industry best practices
3. Monitoring & Testing Program
  The System/AI is configured to:
    generate a detailed monitoring and testing plan that incorporates a balanced mix of transactional, periodic and forensic tests designed to detect and prevent legal and regulatory violations. Testing plan is driven by areas identified in the Risk Assessment
      each test document will contain: (i) the specific rule/regulation citation and summary (e.g., FIG. 13); (ii) testing methodology; (iii) testing results and violation summary (FIG. 14); and remediation plan.
    rank the severity of the deficiencies (e.g., Low, Medium High) based on a number of factors including, but not limited to, the number of violations, whether the violation(s) were identified in prior audit periods (e.g., FIGS. 16 and 17); etc.
    recommend content, sample size and methodology enhancements to existing tests based on new regulatory developments, industry best practices and emerging risks
4. Annual 206(4-7) Report
  The System/AI is configured to:
    generate an "Annual Report" that provides an overview of how the audit was performed, and summarizes the findings
    attach all individual monitoring and testing plans as appendices
    archive the supporting audit documents for reference, automatic retrieval and applicable books and records requirements
5. Reporting Tool
  The AI will deliver an electronic copy of the Annual Report to predetermined recipients for supervisory purposes and archive the Annual Report for books and records purposes
6. Compliance Training
  The System/AI is configured to:
    make training recommendations based on a number of factors including: (i) whether topics were identified in the firm's Risk Assessment; (ii) whether the topic is area of focus of the SEC or other regulatory body; (iii) the number of violations identified as part of the annual review assess whether such training should be completed at the firm, employee and/or department level deliver online training modules directly to relevant employees monitor and record training participation According to some embodiments, users can interact with the compliance system via a collection of interfaces that enable the system to provide the various functionality discussed. FIG. 22 illustrates an example flow for user interaction and the organization of the information made available to the user, as well as AI based functionality. FIG. 23 illustrates an example flow for user interaction and the organization of the information made available to the user.

Example Numbered Embodiments

A1. An interactive data evaluation system, the system comprising:

at least one processor operatively coupled to a memory operatively, the at least one processor when executing configured to:

initiate a data evaluation run over a secured communication channel including a primary display using a first AI model to generate natural language processing "NLP" requests for capturing data to evaluate of a set of compliance requirements for a plurality of compliance targets;

analyze responsive data based on a set of displayed visual interface objects in the primary display showing the NLP requests, the retrieved data associated with each of the compliance targets;

evaluate, using a second AI model the retrieved data for accuracy, responsiveness, and additional data requirements, and automatically generate and display in a subsequent display of the data evaluation run over the secured communication channel supplemental visual interface objects in response to determining additional data is required;

generate, using a third AI model, a status associated with the retrieved data and the data evaluation run responsive to completion of analysis of the retrieved data for each of the compliance targets; and modify a status associated with a first interactive data management execution and modify a display property associated with the first interactive data management execution based on the status, wherein the status includes evaluation of the retrieved data generated from the displayed visual interface objects, supplemental visual interface objects, and any additional data source identified during the interactive data management execution.

A2. An interactive data evaluation system, the system comprising:

at least one processor operatively coupled to a memory operatively, the at least one processor when executing configured to:

initiate a data evaluation run over a secured communication channel including a primary display using a first AI model to generate natural language processing "NLP" requests for capturing data to evaluate of a set of compliance requirements for a plurality of compliance targets;

analyze responsive data based on a set of displayed visual interface objects in the primary display showing the NLP requests, the retrieved data associated with each of the compliance targets;

evaluate, using a second AI model the retrieved data for accuracy, responsiveness, and additional data requirements, and automatically generate and display in a subsequent display of the data evaluation run over the secured communication channel supplemental visual interface objects in response to determining additional data is required;

generate, using a third AI model, a status associated with the retrieved data and the data evaluation run responsive to completion of analysis of the retrieved data for each of the compliance targets; and modify a status associated with a first interactive data management execution and modify a display property associated with the first interactive data management execution based on the status, wherein the status includes evaluation of the retrieved data generated from the displayed visual interface objects, supplemental visual interface objects, and any additional data source identified during the interactive data management execution.

A3. An interactive data evaluation system, the system comprising:

at least one processor operatively coupled to a memory operatively, the at least one processor when executing configured to:

initiate a data evaluation run over a secured communication channel including a primary display using a first AI model to capture data for evaluation of a set of compliance requirements for a plurality of compliance targets;

analyze retrieved data returned based on a set of displayed visual interface objects in the primary display, the retrieved data associated with each of the compliance targets;

evaluate, using a second AI model the retrieved data for accuracy and responsiveness and automatically generate and display in a secondary display of interactive data management execution over the secured communication channel supplemental visual interface objects in response to determining additional data is required;

generate, using a third AI model, a status value associated with the retrieved data responsive to completion of analysis of the retrieved data for each of the compliance targets; and modify a status associated with a first interactive data management execution and modify a display property associated with the first interactive data management execution based on the status, wherein the status includes evaluation of the retrieved data generated from the displayed visual interface objects, supplemental visual interface objects, and any additional data source identified during the interactive data management execution.

A4. An interactive data management system, the system comprising:

at least one processor operatively coupled to a memory operatively, the at least one processor when executing configured to:

initiate an interactive data management execution over a secured communication channel including a primary display using a first AI model to capture data for evaluation of a set of compliance requirements for a plurality of compliance targets:

analyze retrieved data returned based on a set of displayed visual interface objects in the primary display, the retrieved data associated with each of the compliance targets;

evaluate, using a second AI model the retrieved data for accuracy and responsiveness and automatically generate and display in a secondary display of interactive data management execution over the secured communication channel supplemental visual interface objects in response to determining additional data is required; and generate, using a third AI model, a status value associated with the retrieved data responsive to completion of analysis of the retrieved data for each of the compliance targets; and modify a status associated with a first interactive data management execution and modify a display property associated with the first interactive data management execution based on the status, wherein the status includes evaluation of the retrieved data generated from the displayed visual interface objects, supplemental visual interface objects, and any additional data source identified during the interactive data management execution.

A5. An interactive data management system, the system comprising:

at least one processor operatively coupled to a memory operatively, the at least one processor when executing configured to:

initiate an interactive data management execution over a secured communication channel including a primary display using a first AI model to capture data for evaluation of a set of compliance requirements for a plurality of compliance targets;

analyze retrieved data returned based on a set of displayed visual interface objects in the primary display, the retrieved data associated with each of the compliance targets;

evaluate, using a second AI model the retrieved data for accuracy and responsiveness and automatically generate and display in a secondary display of interactive data management execution over the secured communication channel supplemental visual interface objects in response to determining additional data is required;

generate, using a third AI model, a status value associated with the retrieved data responsive to completion of analysis of the retrieved data for each of the compliance targets; and modify a status associated with a first interactive data management execution; and modify a display property associated with the first interactive data management execution based on the status, wherein the status includes evaluation of the retrieved data generated from the displayed visual interface objects, supplemental visual interface objects, and any additional data source identified during the interactive data management execution.

A6. An interactive data management system, the system comprising:

at least one processor operatively coupled to a memory operatively, the at least one processor when executing configured to:

initiate an interactive data management execution over a secured communication channel including a primary display using a first AI model to capture data for evaluation of a set of compliance requirements for a plurality of compliance targets;

analyze retrieved data returned based on a set of displayed visual interface objects in the primary display, the retrieved data associated with each of the compliance targets;

evaluate, using a second AI model the retrieved data for accuracy and responsiveness and automatically generate and display in a secondary display of interactive data management execution over the secured communication channel supplemental visual interface objects in response to determining additional data is required; and generate, using a third AI model, a status value associated with the retrieved data responsive to completion of analysis of the retrieved data for each of the compliance targets; and update a status associated with a first interactive data management execution and update a display property associated with the first interactive data management execution based on the status, wherein the priority update includes evaluation of the retrieved data generated from the displayed visual interface objects, supplemental visual interface objects, and any additional data source identified during the interactive data management execution.

A7. An interactive data management system, the system comprising:

at least one processor operatively coupled to a memory operatively, the at least one processor when executing configured to:

initiate an interactive data management execution including a primary display using a first AI model to capture data for evaluation of a set of compliance requirements for a plurality of compliance targets;

analyze retrieved data returned based on a set of displayed visual interface objects in the primary display, the retrieved data associated with each of the compliance targets;

evaluate, using a second AI model the retrieved data for accuracy and responsiveness and automatically generate and display in a secondary display of interactive data management execution supplemental visual interface objects in response to determining additional data is required; and generate, using a third AI model, a status value associated with the retrieved data responsive to completion of analysis of the retrieved data for each of the compliance targets; and update a priority associated with a first interactive data management execution and update a display property associated with the first interactive data management execution based on the priority, wherein the priority update includes evaluation of the retrieved data generated from the displayed visual interface objects, supplemental visual interface objects, and any additional data source identified during the interactive data management execution.

A8. An interactive data management system, the system comprising:

at least one processor operatively coupled to a memory operatively, the at least one processor when executing configured to:

execute an interactive interface including a primary display using a first AI model to capture data for evaluation of a set of compliance requirements for a plurality of compliance targets;

analyze retrieved data returned based on a set of displayed visual interface objects in the primary display of the interactive interface, the retrieved data associated with each of the compliance targets;

evaluate, using a second AI model the retrieved data for accuracy and responsiveness and automatically generate and display in a secondary display of the interactive interface supplemental visual interface objects in response to determining additional data is required; and generate, using a third AI model, a status value associated with the retrieved data responsive to completion of analysis of the retrieved data for each of the compliance targets; and update a status associated with a compliance evaluation/interactive session and update a visual property associated with the interactive session based on the status, wherein the assessment value includes evaluation of the retrieved data generated from the displayed visual interface objects, supplemental visual interface objects, and any additional data source identified during the interactive data management session.

A9. An interactive data management system, the system comprising:

at least one processor operatively coupled to a memory operatively, the at least one processor when executing configured to:

execute an interactive session including a primary display using a first AI model to capture data for evaluation of a set of compliance requirements for a plurality of compliance targets;

analyze retrieved data returned based on a set of displayed visual interface objects in the primary display of the interactive session, the retrieved data associated with each of the compliance targets;

evaluate, using a second AI model the retrieved data for accuracy and responsiveness and automatically generate and display in a secondary display supplemental visual interface objects in response to determining additional data is required; and generate, using a third AI model, an assessment value associated with the retrieved data responsive to completion of analysis of the retrieved data for each of the compliance targets; and update a status associated with a compliance evaluation/interactive session and update a visual property associated with the interactive session based on the status, wherein the assessment value includes evaluation of the retrieved data generated from the displayed visual interface objects, supplemental visual interface objects, and any additional data source identified during the interactive data management session.

A10. An interactive data management system, the system comprising:

at least one processor operatively coupled to a memory operatively, the at least one processor when executing configured to:

execute an interactive session using a first AI model (e.g., SLM, LLM (e.g., chatbot)) to capture data on which to evaluate a set of compliance requirements for a plurality of compliance targets;

analyze retrieved data returned based on a set of displayed visual interface objects (e.g., displaying audit questions) in the interactive session, the retrieved data associated with each of the compliance targets;

evaluate, using a second AI model (e.g., model trained on prior complete responses to determine pattern match, similarity match to complete responses, etc., SLM, LLM analysis of response to ensure key elements addressed, and trained on incomplete responses, matching patterns to incomplete responses (e.g., no documentary/evidentiary data provided) and/or trained on follow up questions to resolve, automatically generate questions that request missing info, identify missing information based on incomplete matching/similarity) the retrieved data for accuracy and responsiveness and automatically generate and display supplemental visual interface objects (e.g., displaying additional audit questions) in response to determining additional data is required (e.g., including determination that specific responses require additional information to complete); and generate, using a third AI model, an assessment value associated with the retrieved data responsive to completion of analysis of the retrieved data for each of the compliance targets and update a status associated with a compliance evaluation/interactive session, wherein the assessment value includes evaluation of the retrieved data generated from the displayed visual interface objects, supplemental visual interface objects, and any additional data source identified during the interactive data management session.

A10.1. The system of a preceding numbered embodiment, further configured to evaluate, using a first AI model, a plurality of constraints to automatically identify a set of compliance requirements.

A11. The system of a preceding numbered embodiment, wherein the at least one processor is configured to execute the first artificial intelligent ("AI") model trained on a plurality of constraints and linked information requirements responsive to the plurality of rules.

A12. The system of a preceding numbered embodiment, wherein the first AI model accepts the plurality of rules as input and generates natural language text outputs, the NLP outputs tailored to solicit information to verify compliance with the plurality of rules.

A13. The system of a preceding numbered embodiment, wherein the at least one processor or first AI model is further configured to tailor the natural language text outputs (e.g., questions, request for documents, etc.) to a plurality of compliance targets (e.g., branch (e.g., OSJ, non-OSJ, NBL, etc.)) and present the natural language text outputs as at least part of the visual interface object.

A14. The system of a preceding numbered embodiment, wherein the first AI model is configured to accept specification of a compliance target and generate the natural language text outputs tailored to the compliance target.

A15. The system of a preceding numbered embodiment, wherein the at least one processor is configured to execute a second AI model trained on results input to the visual interface objects or answers to information requests and labeled responses.

A16. The system of a preceding numbered embodiment, wherein the labeled responses included complete responses and incomplete responses.

A17. The system of a preceding numbered embodiment, wherein the second AI model is configured to accept respondent answers to information requests and output an evaluation of complete or incomplete.

A18. The system of a preceding numbered embodiment, wherein the second AI model is trained on supplemental responsive information for responses evaluated as incomplete.

A19. The system of a preceding numbered embodiment, wherein the at least one processor or the second AI model is configured to generate supplemental information requests associated with responses classified as incomplete.

A20. The system of a preceding numbered embodiment, wherein the at least one processor is configured to execute a guided interview session with the respondent based on the natural language text outputs.

A21. The system of a preceding numbered embodiment, wherein the at least one processor is configured to generate text to speech audio and present the natural language text outputs as voice prompts to the respondent.

A22. The system of a preceding numbered embodiment, wherein the at least one processor is configured to execute a third AI model trained on responses and labeled risk categories and violations and labeled risk categories.

A23. The system of a preceding numbered embodiment, wherein the at least one processor is configured to execute a fourth AI model (e.g., scheduler AI) trained on compliance task and completion time.

A24. An interactive data management system, the system comprising:
- at least one processor operatively coupled to a memory operatively, the at least one processor when executing configured to:
  - execute an interactive session using a first AI model (e.g., SLM, LLM (e.g., chatbot)) to capture data on which to evaluate a set of compliance requirements for a plurality of compliance targets;
- analyze retrieved data returned based on a set of displayed visual interface objects (e.g., displaying audit questions) in the interactive session, the retrieved data associated with each of the compliance targets;
  - evaluate, using a second AI model (e.g., model trained on prior complete responses to determine pattern match, similarity match to complete responses, etc., SLM, LLM analysis of response to ensure key elements addressed, and trained on incomplete responses, matching patterns to incomplete responses (e.g., no documentary/evidentiary data provided) and/or trained on follow up questions to resolve, automatically generate questions that request missing info, identify missing information based on incomplete matching/similarity) the retrieved data for accuracy and responsiveness and automatically generate and display supplemental visual interface objects (e.g., displaying additional audit questions) in response to determining additional data is required (e.g., including determination that specific responses require additional information to complete); and
  - generate, using a third AI model, an assessment value associated with the retrieved data responsive to completion of analysis of the retrieved data for each of the compliance targets and update a status associated with a compliance evaluation/interactive session, wherein the assessment value includes evaluation of the retrieved data generated from the displayed visual interface objects, supplemental visual interface objects, and any additional data source identified during the interactive data management session.

A25. The system of a preceding numbered embodiment, further configured to evaluate, using a first AI model, a plurality of constraints to automatically identify a set of compliance requirements.

A26. The system of a preceding numbered embodiment, wherein the at least one processor is configured to execute the first artificial intelligent ("AI") model trained on a plurality of constraints and linked information requirements responsive to the plurality of rules.

A27. The system of a preceding numbered embodiment, wherein the first AI model accepts the plurality of rules as input and generates natural language text outputs, the NLP outputs tailored to solicit information to verify compliance with the plurality of rules.

A28. The system of a preceding numbered embodiment, wherein the at least one processor or first AI model is further configured to tailor the natural language text outputs (e.g., questions, request for documents, etc.) to a plurality of compliance targets (e.g., brank (e.g., OSJ, non-OSJ, NBL, etc.)) and present the natural language text outputs as at least part of the visual interface object.

A29. The system of a preceding numbered embodiment, wherein the first AI model is configured to accept specification of a compliance target and generate the natural language text outputs tailored to the compliance target.

A30. The system of a preceding numbered embodiment, wherein the at least one processor is configured to execute a second AI model trained on results input to the visual interface objects or answers to information requests and labeled responses.

A31. The system of a preceding numbered embodiment, wherein the labeled responses included complete responses and incomplete responses.

A32. The system of a preceding numbered embodiment, wherein the second AI model is configured to accept respondent answers to information requests and output an evaluation of complete or incomplete.

A33. The system of claim 30, wherein the second AI model is trained on supplemental responsive information for responses evaluated as incomplete.

A34. The system of claim 31, wherein the at least one processor or the second AI model is configured to generate supplemental information requests associated with responses classified as incomplete.

A35. The system of a preceding numbered embodiment, wherein the at least one processor is configured to execute a guided interview session with the respondent based on the natural language text outputs.

A36. The system of claim 33, wherein the at least one processor is configured to generate text to speech audio and present the natural language text outputs as voice prompts to the respondent.

A37. The system of a preceding numbered embodiment, wherein the at least one processor is configured to execute a third AI model trained on responses and labeled risk categories and violations and labeled risk categories.

A38. The system of a preceding numbered embodiment, wherein the at least one processor is configured to execute a fourth AI model (e.g., scheduler AI) trained on compliance task and completion time.

Figure 3:
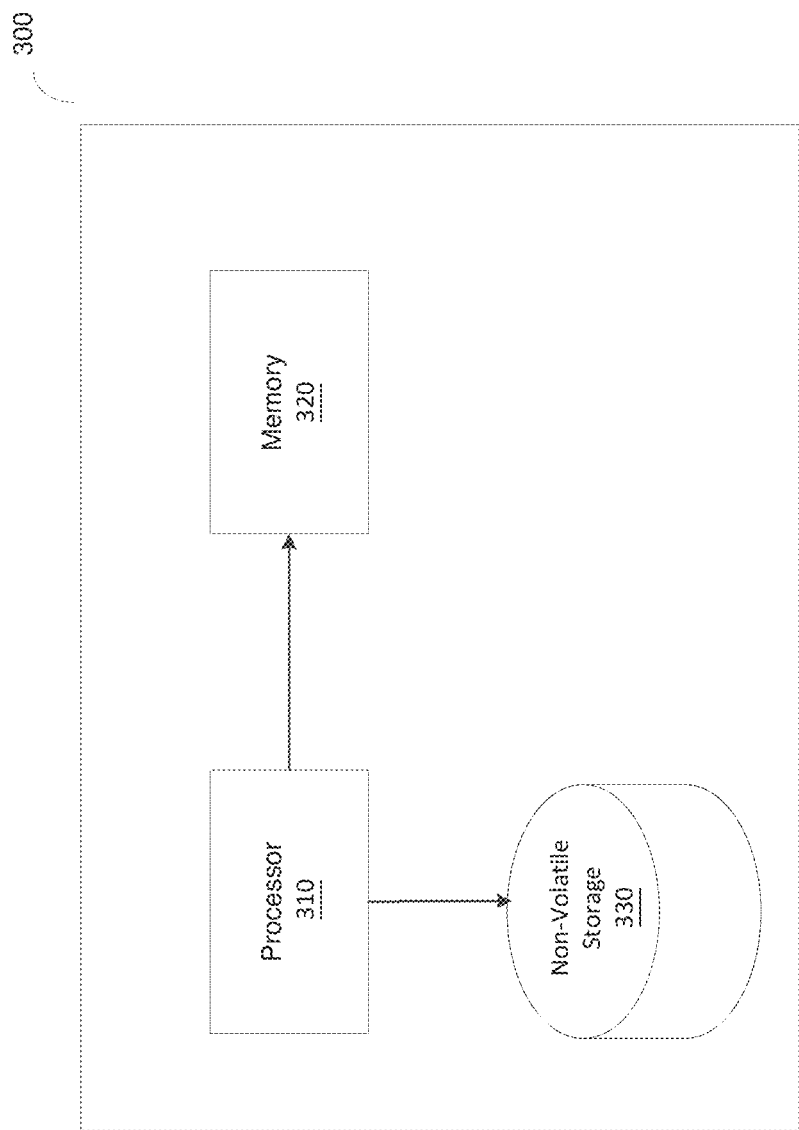
FIG. 3 is a block diagram of an example special purpose computer system improved by the functions and/or processes disclosed herein.

Additionally, an illustrative implementation of a special purpose computer system 300, that may be specially programmed to improve over conventional systems, to be used in connection with any of the embodiments of the disclosure provided herein is shown in FIG. 3. The computer system 300 may include one or more processors 310 and one or more articles of manufacture that comprise non-transitory computer-readable storage media (e.g., memory 320 and one or more non-volatile storage media 330). The processor 310 may control writing data to and reading data from the memory 320 and the non-volatile storage device 330 in any suitable manner. To perform any of the functionality described herein (e.g., secure execution, proxied execution, sandboxed execution, etc.), the processor 310 may execute one or more processor-executable instructions stored in one or more non-transitory computer-readable storage media (e.g., the memory 320), which may serve as non-transitory computer-readable storage media storing processor-executable instructions for execution by the processor 310.

The terms "program" or "software" or "app" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationships between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms. As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements.

This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having the same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed:

1. An artificial intelligence ("AI") system, the system comprising:
   at least one processor;
   a memory operatively coupled to the at least one processor;
   the at least one processor when executing configured to:
      execute an interactive session with a plurality of respondents via a plurality of user interface displays that accept and tailor subsequent user interface displays dynamically during the interactive session based on artificial intelligent outputs returned during the interactive session;
      instantiate a first AI model, trained on regulatory information and custom policy information and trained to output a set of requirements associated with the regulatory information and custom client policy information;
      evaluate, using the first AI model, a plurality of constraints defined by input regulatory information and input custom policy information to automatically identify and output a set of execution requirements for one or more targets;
      instantiate a second AI model trained on execution requirement inputs and trained to output text based questions and requests for validation data associated with at least some of the text based questions;
      automatically generate, using, at least in part, a second AI model, visual interface objects including a dynamically generated set of questions or requests for information for display in a user interface to capture user free text input on which to evaluate execution status for the set of execution requirements on a plurality of execution targets based on responses to the text based questions and responses to the request for validation objects, wherein the set of execution requirements include multiple client locations each having respective requirements;

tailor the interactive guided session and associated user interface displays based on a respective client location and the respective requirements associated with the interactive session;

analyze the free text input to the displayed visual interface objects from the interactive session display, the free text input associated with the respective execution targets;

instantiate a third AI model trained on, at least in part, complete free text responses and incomplete free text responses and trained to output identification of incomplete or partial responses;

automatically evaluate, using a third AI model, the retrieved free text responses and automatically generate and display supplemental visual interface objects in response to determining a user interface input for a respective free text response is incomplete or partially complete, some of the supplemental visual interface objects including at least text based questions and requests for validation data; and generate, using a fourth AI model, an assessment responsive to completion of analysis of the results for each of the execution targets and update a status associated with an execution evaluation, wherein the assessment includes analysis of the retrieved results generated from the displayed visual interface objects, supplemental visual interface objects, and any additional data source.

2. The system of claim 1, wherein the at least one processor is configured to select and execute a respective instance of the second artificial intelligent ("AI") model trained on a plurality of constraints and linked information requirements responsive to definition of the set of execution requirements.

3. The system of claim 2, wherein the second AI model accepts the set of execution requirements as input during training and generates natural language processing ("NLP") text outputs during prediction, the NLP outputs configured to solicit information to verify execution requirements and any of the plurality constraints and linked information requirements.

4. The system of claim 3, wherein the at least one processor or second AI model is further configured to tailor the NLP text outputs to a plurality of execution targets and present the NLP text outputs as at least part of the visual interface object.

5. The system of claim 3, wherein the second AI model is configured to accept specification of an execution target and generate the NLP text outputs tailored to the execution target.

6. The system of claim 1, wherein the at least one processor is configured to execute a third AI model trained on answers to information requests and labeled responses.

7. The system of claim 6, wherein the labeled responses included complete responses and incomplete responses.

8. The system of claim 6, wherein the third AI model is configured to accept respondent answers to information requests and predict an output evaluation of complete or incomplete.

9. The system of claim 8, wherein the third AI model is also trained on supplemental responsive information and responses evaluated as incomplete.

10. The system of claim 9, wherein the at least one processor or the third AI model is configured to generate supplemental information requests associated with responses classified as incomplete.

11. The system of claim 3, wherein the at least one processor is configured to execute a guided interview session with a respondent based on the NLP text outputs.

12. The system of claim 11, wherein the at least one processor is configured to generate text to speech audio and present the NLP text outputs as voice prompts to the respondent.

13. The system of claim 1, wherein the at least one processor is configured to execute the fourth AI model trained on responses and labeled risk categories or violations and labeled risk categories.

14. The system of claim 1, wherein the at least one processor is configured to execute the fourth AI model trained on execution task and completion time.

15. A computer implementation method for managing an artificial intelligence ("AI") system, the method comprising:

executing, by at least one processor, an interactive session with a plurality of respondents via a plurality of user interface displays that accept and tailor subsequent user interface displays dynamically during the interactive session based on artificial intelligent outputs returned during the interactive session;

instantiating a first AI model, trained on regulatory information and custom policy information, and trained to output a set of requirements associated with the regulatory information and custom client policy information;

evaluating, using the first AI model executed by the at least one processor, a plurality of constraints defined by input regulatory information and input custom policy information to automatically identify and output a set of execution requirements for one or more targets;

instantiating a second AI model trained on execution requirement inputs and trained to output text based questions and requests for validation data associated with at least some of the text based questions;

generating, automatically, at least in part, with a second AI model executed by the at least one processor, visual interface objects including a dynamically generated set of questions or requests for information for display in a user interface to capture user text input submissions on which to evaluate execution status for the set of execution requirements on a plurality of execution targets based on responses to the text based questions and responses to the request for validation objects, wherein the set of execution requirements include multiple client locations each having respective requirements;

tailoring, by the at least one processor, the interactive guided session and associated user interface displays based on a respective client location and the respective requirements associated with the interactive session;

instantiate a third AI model trained on, at least in part, complete free text responses and incomplete free text responses and trained to output identification of incomplete or partial responses;

analyzing, by the at least one processor, the free text input to the displayed visual interface objects from the interactive session display, the free text input associated with the respective execution targets, automatically evaluating, using the third AI model executed by the at least one processor, the free text input and automatically generating and displaying supplemental visual interface objects in response to determining a user interface input for a respective free text response is incomplete or partially complete, some of the supplemental visual interface objects including at least text based questions and requests for validation data; and generating, using a fourth AI model executed by the at least one processor, an assessment responsive to completion of analysis of the results for each of the execution targets and update a status associated with an execution evaluation, wherein the assessment includes analysis of the retrieved results generated from the displayed visual interface objects, supplemental visual interface objects, and any additional data source.

16. The method of claim 15, wherein the method comprises selecting and executing, by the at least one processor, a respective instance of the second artificial intelligent ("AI") model trained on a plurality of constraints and linked information requirements responsive to definition of the set of execution requirements.

17. The method of claim 16, wherein the method comprises accepting the set of execution requirements as input during training of the second AI model and generating natural language processing ("NLP") text outputs during prediction, the NLP outputs configured to solicit information to verify execution requirements and any of the plurality constraints and linked information requirements.

18. The method of claim 17, wherein the method comprising tailoring the NLP text outputs to a plurality of execution targets and presenting the NLP text outputs as at least part of the visual interface object by the at least one processor or the second AI model.

19. The method of claim 17, wherein the second AI model is configured to accept specification of an execution target and generate the NLP text outputs tailored to the execution target.

20. The method of claim 15, wherein the method further comprises executing, by the at least one processor, the third AI model trained on answers to information requests and labeled responses.

* * * * *